United States Patent
Jablokov et al.

(10) Patent No.: US 9,053,489 B2
(45) Date of Patent: Jun. 9, 2015

(54) FACILITATING PRESENTATION OF ADS RELATING TO WORDS OF A MESSAGE

(75) Inventors: Victor Roditis Jablokov, Charlotte, NC (US); Igor Roditis Jablokov, Charlotte, NC (US); James Richard Terrell, II, Charlotte, NC (US); Marc White, Charlotte, NC (US); Scott Edward Paden, Charlotte, NC (US)

(73) Assignee: Canyon IP Holdings LLC, Wilmington, DE (US)

( * ) Notice: Subject to any disclaimer, the term of this patent is extended or adjusted under 35 U.S.C. 154(b) by 0 days.

(21) Appl. No.: 13/570,805

(22) Filed: Aug. 9, 2012

(65) Prior Publication Data

US 2012/0303445 A1 Nov. 29, 2012

Related U.S. Application Data

(63) Continuation of application No. 12/212,645, filed on Sep. 17, 2008, which is a continuation-in-part of application No. 12/198,116, filed on Aug. 25, 2008, said application No. 12/198,116 is a
(Continued)

(51) Int. Cl.
*G06F 15/16* (2006.01)
*G06Q 30/02* (2012.01)
(Continued)

(52) U.S. Cl.
CPC .......... *G06Q 30/02* (2013.01); *G06F 17/30864* (2013.01); *G06Q 30/0271* (2013.01); *H04M 1/72547* (2013.01); *G06F 17/30899* (2013.01); *G06Q 30/0256* (2013.01); *H04M 3/4938* (2013.01); *G10L 21/00* (2013.01); *G06F 17/30867* (2013.01); *G06F 17/30905* (2013.01); *H04L 69/329* (2013.01);
(Continued)

(58) Field of Classification Search
CPC ............. G06Q 30/02; G06Q 30/0273; G06Q 30/0277; G06Q 30/0269; G06Q 30/0251; G06Q 30/0261; G06Q 30/0267; G06Q 30/0255; G06Q 30/0257; H04M 3/4878; H04L 51/063; H04L 12/58; H04L 67/02; H04L 69/329
USPC .............. 709/206, 217, 219; 705/14.4, 14.49, 705/14.73; 707/705, 736; 704/270.1, 235
See application file for complete search history.

(56) References Cited

U.S. PATENT DOCUMENTS 5,675,507 A   10/1997  Bobo, II
5,948,061 A *  9/1999  Merriman et al. ............ 709/219
(Continued)

FOREIGN PATENT DOCUMENTS

EP   1274222 A2    1/2003
WO   WO 2006/101528 A1    9/2006

OTHER PUBLICATIONS

Orion, J2EE Application Overview dated Mar. 1, 2001.
(Continued)

*Primary Examiner* — Oleg Survillo
(74) *Attorney, Agent, or Firm* — Knobbe Martens Olson & Bear LLP

(57) ABSTRACT

Targeted delivery of contextually relevant ad impressions to a mobile device is provided. The ad impressions are delivered within text messages and/or instant message chat threads. Monetizing of text messaging and instant messaging by providers of such services is achieved, while providing unobtrusive and contextually relevant information to users of such services.

28 Claims, 25 Drawing Sheets

Instant Messaging Communications Between Adam and Betty

Related U.S. Application Data continuation-in-part of application No. 12/197,227, filed on Aug. 22, 2008, now abandoned.

(60) Provisional application No. 61/021,335, filed on Jan. 16, 2008, provisional application No. 60/957,701, filed on Aug. 23, 2007, provisional application No. 60/957,702, filed on Aug. 23, 2007, provisional application No. 60/972,851, filed on Sep. 17, 2007, provisional application No. 60/972,853, filed on Sep. 17, 2007, provisional application No. 60/972,854, filed on Sep. 17, 2007, provisional application No. 60/972,936, filed on Sep. 17, 2007, provisional application No. 60/972,943, filed on Sep. 17, 2007, provisional application No. 60/972,944, filed on Sep. 17, 2007, provisional application No. 61/016,586, filed on Dec. 25, 2007, provisional application No. 61/021,341, filed on Jan. 16, 2008, provisional application No. 61/034,815, filed on Mar. 7, 2008, provisional application No. 61/038,046, filed on Mar. 19, 2008, provisional application No. 61/041,219, filed on Mar. 31, 2008, provisional application No. 61/091,330, filed on Aug. 22, 2008, provisional application No. 60/957,386, filed on Aug. 22, 2007, provisional application No. 60/957,393, filed on Aug. 22, 2007.

(51) Int. Cl.

| | | |
|---|---|---|
| G06F 17/30 | (2006.01) | |
| H04M 1/725 | (2006.01) | |
| H04M 3/493 | (2006.01) | |
| G10L 21/00 | (2013.01) | |
| H04L 29/08 | (2006.01) | |
| G06Q 10/10 | (2012.01) | |
| G06Q 30/06 | (2012.01) | |
| G06F 3/16 | (2006.01) | |
| H04L 12/58 | (2006.01) | |

(52) U.S. Cl.
CPC ...... *H04M 2201/40* (2013.01); *G06Q 30/0269* (2013.01); *G06Q 10/107* (2013.01); *H04L 67/02* (2013.01); *G06Q 30/0631* (2013.01); *G06F 3/167* (2013.01); *H04L 12/58* (2013.01); *G06Q 30/0257* (2013.01); *G06Q 30/0261* (2013.01); *G06Q 30/0255* (2013.01); *G06Q 30/0251* (2013.01); *G06Q 30/0277* (2013.01); *G06Q 30/0273* (2013.01)

(56) References Cited

U.S. PATENT DOCUMENTS

| | | | | |
|---|---|---|---|---|
| 5,974,413 | A | 10/1999 | Beauregard et al. | |
| 6,026,368 | A * | 2/2000 | Brown et al. | 705/14.56 |
| 6,173,259 | B1 | 1/2001 | Bijl et al. | |
| 6,219,407 | B1 | 4/2001 | Kanevsky et al. | |
| 6,219,638 | B1 | 4/2001 | Padmanabhan et al. | |
| 6,298,326 | B1 | 10/2001 | Feller | |
| 6,401,075 | B1 * | 6/2002 | Mason et al. | 705/14.72 |
| 6,490,561 | B1 | 12/2002 | Wilson et al. | |
| 6,532,446 | B1 | 3/2003 | King | |
| 6,654,448 | B1 | 11/2003 | Agraharam et al. | |
| 6,687,339 | B2 | 2/2004 | Martin | |
| 6,687,689 | B1 | 2/2004 | Fung et al. | |
| 6,704,034 | B1 | 3/2004 | Rodriguez et al. | |
| 6,760,700 | B2 | 7/2004 | Lewis et al. | |
| 6,775,360 | B2 | 8/2004 | Davidson et al. | |
| 6,816,578 | B1 | 11/2004 | Kredo et al. | |
| 6,820,055 | B2 | 11/2004 | Saindon et al. | |
| 6,895,084 | B1 | 5/2005 | Saylor et al. | |
| 7,007,074 | B2 * | 2/2006 | Radwin | 709/217 |
| 7,013,275 | B2 | 3/2006 | Arnold et al. | |
| 7,035,804 | B2 | 4/2006 | Saindon et al. | |
| 7,035,901 | B1 * | 4/2006 | Kumagai et al. | 709/206 |
| 7,039,599 | B2 * | 5/2006 | Merriman et al. | 705/14.52 |
| 7,089,184 | B2 | 8/2006 | Rorex | |
| 7,089,194 | B1 * | 8/2006 | Berstis et al. | 705/14.54 |
| 7,136,875 | B2 * | 11/2006 | Anderson et al. | 1/1 |
| 7,146,320 | B2 | 12/2006 | Ju et al. | |
| 7,146,615 | B1 | 12/2006 | Hervet et al. | |
| 7,181,387 | B2 | 2/2007 | Ju et al. | |
| 7,200,555 | B1 | 4/2007 | Ballard et al. | |
| 7,206,932 | B1 | 4/2007 | Kirchhoff | |
| 7,225,224 | B2 | 5/2007 | Nakamura | |
| 7,233,655 | B2 | 6/2007 | Gailey et al. | |
| 7,236,580 | B1 | 6/2007 | Sarkar et al. | |
| 7,254,384 | B2 | 8/2007 | Gailey et al. | |
| 7,260,534 | B2 | 8/2007 | Gandhi et al. | |
| 7,280,966 | B2 | 10/2007 | Ju et al. | |
| 7,302,280 | B2 | 11/2007 | Hinckley et al. | |
| 7,313,526 | B2 | 12/2007 | Roth et al. | |
| 7,330,815 | B1 | 2/2008 | Jochumson | |
| 7,376,556 | B2 | 5/2008 | Bennett | |
| 7,392,185 | B2 | 6/2008 | Bennett | |
| 7,401,122 | B2 * | 7/2008 | Chen | 709/206 |
| 7,539,086 | B2 | 5/2009 | Jaroker | |
| 7,555,431 | B2 | 6/2009 | Bennett | |
| 7,571,100 | B2 | 8/2009 | Lenir et al. | |
| 7,577,569 | B2 | 8/2009 | Roth et al. | |
| 7,590,534 | B2 | 9/2009 | Vatland | |
| 7,634,403 | B2 | 12/2009 | Roth et al. | |
| 7,640,158 | B2 | 12/2009 | Detlef et al. | |
| 7,650,284 | B2 | 1/2010 | Cross et al. | |
| 7,657,424 | B2 | 2/2010 | Bennett | |
| 7,668,718 | B2 | 2/2010 | Kahn et al. | |
| 7,672,841 | B2 | 3/2010 | Bennett | |
| 7,702,508 | B2 | 4/2010 | Bennett | |
| 7,716,058 | B2 | 5/2010 | Roth et al. | |
| 7,725,307 | B2 | 5/2010 | Bennett | |
| 7,725,321 | B2 | 5/2010 | Bennett | |
| 7,729,904 | B2 | 6/2010 | Bennett | |
| 7,729,912 | B1 | 6/2010 | Bacchiani et al. | |
| 7,757,162 | B2 | 7/2010 | Barrus et al. | |
| 7,796,980 | B1 | 9/2010 | McKinney et al. | |
| 7,890,586 | B1 | 2/2011 | McNamara et al. | |
| 7,899,670 | B1 | 3/2011 | Young et al. | |
| 7,899,671 | B2 | 3/2011 | Cooper et al. | |
| 7,925,716 | B2 * | 4/2011 | Zhang et al. | 709/218 |
| 8,027,836 | B2 | 9/2011 | Baker et al. | |
| 8,032,372 | B1 | 10/2011 | Zimmerman et al. | |
| 8,050,918 | B2 | 11/2011 | Ghasemi et al. | |
| 8,106,285 | B2 | 1/2012 | Gerl et al. | |
| 8,117,268 | B2 | 2/2012 | Jablokov et al. | |
| 8,135,578 | B2 | 3/2012 | Hébert | |
| 8,145,493 | B2 | 3/2012 | Cross, Jr. et al. | |
| 8,301,454 | B2 | 10/2012 | Paden | |
| 8,326,636 | B2 | 12/2012 | White | |
| 8,335,830 | B2 | 12/2012 | Jablokov et al. | |
| 8,352,261 | B2 | 1/2013 | Terrell, II et al. | |
| 2001/0047294 | A1 * | 11/2001 | Rothschild | 705/14 |
| 2001/0056369 | A1 * | 12/2001 | Takayama et al. | 705/14 |
| 2002/0029101 | A1 | 3/2002 | Larson et al. | |
| 2002/0035474 | A1 | 3/2002 | Alpdemir | |
| 2002/0052781 | A1 | 5/2002 | Aufricht et al. | |
| 2002/0091570 | A1 * | 7/2002 | Sakagawa | 705/14 |
| 2002/0165719 | A1 | 11/2002 | Wang et al. | |
| 2002/0165773 | A1 | 11/2002 | Natsuno et al. | |
| 2003/0008661 | A1 | 1/2003 | Joyce et al. | |
| 2003/0028601 | A1 | 2/2003 | Rowe | |
| 2003/0050778 | A1 | 3/2003 | Nguyen et al. | |
| 2003/0093315 | A1 * | 5/2003 | Sato | 705/14 |
| 2003/0101054 | A1 | 5/2003 | Davis et al. | |
| 2003/0105630 | A1 | 6/2003 | MacGinitie et al. | |
| 2003/0125955 | A1 | 7/2003 | Arnold et al. | |
| 2003/0126216 | A1 | 7/2003 | Avila et al. | |
| 2003/0139922 | A1 * | 7/2003 | Hoffmann et al. | 704/201 |
| 2003/0144906 | A1 * | 7/2003 | Fujimoto et al. | 705/14 |
| 2003/0182113 | A1 | 9/2003 | Huang | |
| 2003/0200093 | A1 | 10/2003 | Lewis et al. | |
| 2003/0212554 | A1 | 11/2003 | Vatland | |

(56) References Cited

U.S. PATENT DOCUMENTS

| | | | |
|---|---|---|---|
| 2003/0220798 A1 | 11/2003 | Schmid et al. | |
| 2003/0223556 A1 | 12/2003 | Ju et al. | |
| 2004/0005877 A1 | 1/2004 | Väänänen | |
| 2004/0015547 A1 | 1/2004 | Griffin et al. | |
| 2004/0059632 A1* | 3/2004 | Kang et al. | 705/14 |
| 2004/0059708 A1* | 3/2004 | Dean et al. | 707/1 |
| 2004/0059712 A1* | 3/2004 | Dean et al. | 707/1 |
| 2004/0107107 A1 | 6/2004 | Lenir et al. | |
| 2004/0133655 A1 | 7/2004 | Yen et al. | |
| 2004/0151358 A1 | 8/2004 | Yanagita et al. | |
| 2004/0176906 A1 | 9/2004 | Matsubara et al. | |
| 2005/0010641 A1 | 1/2005 | Staack | |
| 2005/0021344 A1 | 1/2005 | Davis et al. | |
| 2005/0027538 A1 | 2/2005 | Halonen et al. | |
| 2005/0080786 A1 | 4/2005 | Fish et al. | |
| 2005/0101355 A1 | 5/2005 | Hon et al. | |
| 2005/0102142 A1 | 5/2005 | Soufflet et al. | |
| 2005/0197145 A1 | 9/2005 | Chae et al. | |
| 2005/0209868 A1 | 9/2005 | Wan et al. | |
| 2005/0239495 A1 | 10/2005 | Bayne | |
| 2005/0240406 A1 | 10/2005 | Carroll | |
| 2005/0261907 A1 | 11/2005 | Smolenski et al. | |
| 2005/0288926 A1 | 12/2005 | Benco et al. | |
| 2006/0052127 A1 | 3/2006 | Wolter | |
| 2006/0053016 A1 | 3/2006 | Falcon et al. | |
| 2006/0129455 A1* | 6/2006 | Shah | 705/14 |
| 2006/0149558 A1 | 7/2006 | Kahn et al. | |
| 2006/0149630 A1* | 7/2006 | Elliott et al. | 705/14 |
| 2006/0195541 A1 | 8/2006 | Ju et al. | |
| 2006/0217159 A1 | 9/2006 | Watson | |
| 2006/0235695 A1 | 10/2006 | Thrift et al. | |
| 2007/0005795 A1 | 1/2007 | Gonzalez | |
| 2007/0038740 A1 | 2/2007 | Steeves | |
| 2007/0038923 A1 | 2/2007 | Patel | |
| 2007/0061300 A1 | 3/2007 | Ramer et al. | |
| 2007/0079383 A1 | 4/2007 | Gopalakrishnan | |
| 2007/0115845 A1 | 5/2007 | Hochwarth et al. | |
| 2007/0118426 A1 | 5/2007 | Barnes, Jr. | |
| 2007/0118592 A1 | 5/2007 | Bachenberg | |
| 2007/0123222 A1 | 5/2007 | Cox et al. | |
| 2007/0133769 A1 | 6/2007 | Da Palma et al. | |
| 2007/0133771 A1 | 6/2007 | Stifelman et al. | |
| 2007/0156400 A1 | 7/2007 | Wheeler | |
| 2007/0180718 A1 | 8/2007 | Fourquin et al. | |
| 2007/0233487 A1 | 10/2007 | Cohen et al. | |
| 2007/0239837 A1 | 10/2007 | Jablokov et al. | |
| 2007/0255794 A1 | 11/2007 | Coutts | |
| 2008/0016142 A1 | 1/2008 | Schneider | |
| 2008/0040683 A1 | 2/2008 | Walsh | |
| 2008/0065481 A1* | 3/2008 | Immorlica et al. | 705/14 |
| 2008/0065737 A1 | 3/2008 | Burke et al. | |
| 2008/0077406 A1 | 3/2008 | Ganong, III | |
| 2008/0155060 A1 | 6/2008 | Weber et al. | |
| 2008/0172781 A1 | 7/2008 | Popowich et al. | |
| 2008/0195588 A1 | 8/2008 | Kim et al. | |
| 2008/0198981 A1 | 8/2008 | Skakkebaek et al. | |
| 2008/0200153 A1* | 8/2008 | Fitzpatrick et al. | 455/414.1 |
| 2008/0208590 A1 | 8/2008 | Cross, Jr. et al. | |
| 2008/0243500 A1 | 10/2008 | Bisani et al. | |
| 2008/0261564 A1 | 10/2008 | Logan | |
| 2008/0275864 A1 | 11/2008 | Kim et al. | |
| 2008/0275873 A1 | 11/2008 | Bosarge et al. | |
| 2008/0301250 A1 | 12/2008 | Hardy | |
| 2008/0313039 A1* | 12/2008 | Altberg et al. | 705/14 |
| 2009/0006194 A1* | 1/2009 | Sridharan et al. | 705/14 |
| 2009/0012793 A1 | 1/2009 | Dao et al. | |
| 2009/0037255 A1* | 2/2009 | Chiu et al. | 705/10 |
| 2009/0043855 A1 | 2/2009 | Bookstaff et al. | |
| 2009/0055175 A1 | 2/2009 | Terrell, II et al. | |
| 2009/0063268 A1* | 3/2009 | Burgess et al. | 705/14 |
| 2009/0076917 A1 | 3/2009 | Jablokov et al. | |
| 2009/0077493 A1 | 3/2009 | Hempel et al. | |
| 2009/0083032 A1 | 3/2009 | Jablokov et al. | |
| 2009/0086958 A1* | 4/2009 | Altberg et al. | 379/265.09 |
| 2009/0117922 A1 | 5/2009 | Bell | |
| 2009/0124272 A1 | 5/2009 | White et al. | |
| 2009/0141875 A1 | 6/2009 | Demmitt et al. | |
| 2009/0150405 A1* | 6/2009 | Grouf et al. | 707/10 |
| 2009/0163187 A1 | 6/2009 | Terrell, II | |
| 2009/0170478 A1 | 7/2009 | Doulton | |
| 2009/0182560 A1 | 7/2009 | White | |
| 2009/0210214 A1 | 8/2009 | Qian et al. | |
| 2009/0228274 A1 | 9/2009 | Terrell, II et al. | |
| 2009/0240488 A1 | 9/2009 | White et al. | |
| 2009/0248415 A1 | 10/2009 | Jablokov et al. | |
| 2009/0271194 A1 | 10/2009 | Davis et al. | |
| 2009/0276215 A1 | 11/2009 | Hager | |
| 2009/0282363 A1 | 11/2009 | Jhaveri et al. | |
| 2009/0307090 A1* | 12/2009 | Gupta et al. | 705/14.58 |
| 2009/0312040 A1* | 12/2009 | Gupta et al. | 455/466 |
| 2009/0319187 A1* | 12/2009 | Deeming et al. | 701/300 |
| 2010/0017294 A1* | 1/2010 | Mancarella et al. | 705/14.55 |
| 2010/0049525 A1 | 2/2010 | Paden | |
| 2010/0058200 A1 | 3/2010 | Jablokov et al. | |
| 2010/0146077 A1 | 6/2010 | Davies et al. | |
| 2010/0180202 A1 | 7/2010 | Del Valle Lopez | |
| 2010/0182325 A1 | 7/2010 | Cederwall et al. | |
| 2010/0191619 A1 | 7/2010 | Dicker et al. | |
| 2010/0268726 A1* | 10/2010 | Gorodyansky et al. | 707/765 |
| 2010/0278453 A1 | 11/2010 | King | |
| 2010/0279667 A1* | 11/2010 | Wehrs et al. | 455/414.1 |
| 2010/0293242 A1 | 11/2010 | Buchheit et al. | |
| 2010/0312619 A1* | 12/2010 | Ala-Pietila et al. | 705/14.1 |
| 2010/0312640 A1* | 12/2010 | Haldeman et al. | 705/14.49 |
| 2011/0029876 A1 | 2/2011 | Slotznick et al. | |
| 2011/0040629 A1* | 2/2011 | Chiu et al. | 705/14.66 |
| 2011/0047452 A1 | 2/2011 | Ativanichayaphong et al. | |
| 2011/0064207 A1* | 3/2011 | Chiu et al. | 379/88.22 |
| 2011/0161276 A1 | 6/2011 | Krumm et al. | |
| 2011/0313764 A1* | 12/2011 | Bacchiani et al. | 704/235 |
| 2012/0095831 A1* | 4/2012 | Aaltonen et al. | 705/14.52 |
| 2012/0259729 A1 | 10/2012 | Linden et al. | |
| 2013/0158994 A1 | 6/2013 | Jaramillo et al. | |
| 2013/0226894 A1* | 8/2013 | Venkataraman et al. | 707/706 |
| 2013/0281007 A1* | 10/2013 | Edge et al. | 455/3.01 |

OTHER PUBLICATIONS

Bisani, M., et al., Automatic editing in a back-end speech-to-text system, 2008, 7 pages.

Brown, E., et al., Capitalization Recovery for Text, Springer-Verlag Berlin Heidelberg, 2002, 12 pages.

Desilets, A., et al., Extracting keyphrases from spoken audio documents, Springer-Verlag Berlin Heidelberg, 2002, 15 pages.

Fielding, et al., Hypertext Transfer Protocol-HTTP/ 1.1, RFC 2616, Network Working Group, sections 7,9.5, 14.30, 12 pages total, Jun. 1999.

Glaser et al., Web-based Telephony Bridges for the Deaf, 5 pages total. Proceedings of the South African Telecommunications Networks & Applications Conference (SATNAC 2003), George, South Africa.

Gotoh, Y., et al., Sentence Boundary Detection in Broadcase Speech Transcripts, Proceedings fo the ISCA Workshop, 2000, 8 pages.

Huang, J., et al., Extracting caller information from voicemail, Springer-Verlag Berlin Heidelberg, 2002, 11 pages.

Huang, J., et al., Maximum entropy model for punctuation annotation from speech, In: ICSLP 2002, pp. 917-920.

Information Disclosure Statement (IDS) Letter Regarding Common Patent Application(s), dated Dec. 6, 2010.

Information Disclosure Statement (IDS) Letter Regarding Common Patent Application(s), dated Feb. 14, 2012.

Information Disclosure Statement (IDS) Letter Regarding Common Patent Application(s), dated Jul. 21, 2009.

Information Disclosure Statement (IDS) Letter Regarding Common Patent Application(s), dated Jul. 21, 2011.

Information Disclosure Statement (IDS) Letter Regarding Common Patent Application(s), dated Jun. 4, 2010.

Information Disclosure Statement (IDS) Letter Regarding Common Patent Application(s), dated Mar. 17, 2011.

Information Disclosure Statement (IDS) Letter Regarding Common Patent Application(s), dated Nov. 24, 2009.

(56) References Cited

OTHER PUBLICATIONS

International Search Report and Written Opinion of the International Search Authority (Korean Intellectual Property Office) in Yap, Inc. International Patent Application Serial No. PCT/US2007/008621, dated Nov. 13, 2007, 13 pages total.

J2EE Application Overview, publicly available on http://www.orionserver.com/docs/j2eeoverview.html since Mar. 1, 2001. Retrieved on Oct. 26, 2007.

Justo, R., et al., Phrase classes in two-level language models for ASR, Springer-Verlag London Limited, 2008, 11 pages.

Kemsley, David H., et al., A Survey of Neural Network Research and Fielded Applications, 1992, In International Journal of Neural Networks, Research and Applications, vol. 2, No. 2/3/4, pp. 123-133. Accessed on Oct. 25, 2007 at http://citeseer.ist.psu.edu/cache/papers/cs/25638/ftp.zSzzSzaxon.cs.byu.eduzSzpubzSzpaperszSzkemsley_92.pdf/kemsley92survery.pdf.

Kimura, K., et al., Assocation-based natural language processing with neural networks, In proceedings of the 7th annual meeting of the association of computational linguistics, 1992, pp. 223-231.

Knudsen, Jonathan, Session Handling in MIDP, Jan. 2002, retrieved from http://developers.sun.com/mobility/midp/articles/sessions/ on Jul. 25, 2008, 7 pages total.

Lewis et al., SoftBridge: An Architecture for Building IP-based Bridges over the Digital Divide, 5 pages total, Proceedings of the South African Telecommunications Networks & Applications Conference (SATNAC 2001), Wild Coast Sun, South Africa.

Marshall, James, HTTP Made Really Easy, Aug. 15, 1997, retrieved from http://www.jmarshall.com/easy/http/on Jul. 25, 2008, 15 pages total.

Ries, K., Segmenting conversations by topic, initiative, and style, Springer-Verlag Berlin Heidelberg, 2002, 16 pages.

Shriberg, E., et al., Prosody-based automatic segmentation of speech into sentences and topics, 2000, 31 pages.

Thomae, M., Fabian, T.,et al., Hierarchical Language Models for One-Stage Speech Interpretation, In Interspeech-2005, pp. 3425-3428.

Transl8it! translation engine, publicly available on http://www.transl8it.com since May 30, 2002. Retrieved on Oct. 26, 2007.

vBulletin Community Forum, thread posted on Mar. 5, 2004. Page retrieved on Oct. 26, 2007 from http://www.vbulletin.com/forum/showthread.php?t=96976.

\* cited by examiner

| Adam | "hey, what are you doing tonight?" |
|---|---|
| Betty | "I don't know, what did you have in mind?" |
| Adam | "I have this inexplicable craving for sushi. What do you think?" |
| Betty | "That sounds good, I haven't had sushi in forever. Maybe we could see a movie afterwards?" |
| Adam | "Sounds good to me, pick you up at 7?" |
| Betty | "See you then" |

*FIG. 4*

Text Messaging Between Adam and Betty

Text Messaging Between Adam and Betty

Text Messaging Between Adam and Betty

Instant Messaging Between Adam and Betty

FIG. 15  Instant Messaging Communications Between Adam and Betty

FIG. 17  Instant Messaging Communications Between Adam and Betty

Text Messaging Communications From Adam to Betty

FIG. 23  Text Messaging Communications From Adam to Betty

FACILITATING PRESENTATION OF ADS RELATING TO WORDS OF A MESSAGE

CROSS-REFERENCE TO RELATED APPLICATIONS

The present application is a continuation of U.S. application Ser. No. 12/212,645, filed Sep. 17, 2008. U.S. application Ser. No. 12/212,645 is a continuation-in-part of U.S. application Ser. No. 12/198,116, filed Aug. 25, 2008 and claims priority from U.S. Provisional No. 61/021,335, filed Jan. 16, 2008. U.S. application Ser. No. 12/198,116 is (1) a continuation-in-part of U.S. application Ser. No. 12/197,227, filed Aug. 22, 2008, now abandoned. U.S. application Ser. No. 12/198,116 also claims priority from: (A) U.S. Provisional No. 60/957,701, filed Aug. 23, 2007; (B) U.S. Provisional No. 60/957,702, filed Aug. 23, 2007; (C) U.S. Provisional No. 60/972,851, filed Sep. 17, 2007; (D) U.S. Provisional No. 60/972,853, filed Sep. 17, 2007; (E) U.S. Provisional No. 60/972,854, filed Sep. 17, 2007; (F) U.S. Provisional No. 60/972,936, filed Sep. 17, 2007; (G) U.S. Provisional No. 60/972,943, filed Sep. 17, 2007; (H) U.S. Provisional No. 60/972,944, filed Sep. 17, 2007; (I) U.S. Provisional No. 61/016,586, filed Dec. 25, 2007; (J) U.S. Provisional No. 61/021,341, filed Jan. 16, 2008; (K) U.S. Provisional No. 61/034,815, filed Mar. 7, 2008; (L) U.S. Provisional No. 61/038,046, filed Mar. 19, 2008; (M) U.S. Provisional No. 61/041,219, filed Mar. 31, 2008; and (N) U.S. Provisional No. 61/091,330, filed Aug. 22, 2008. U.S. application Ser. No. 12/197,227 claims priority from: (A) U.S. Provisional No. 60/957,386, filed Aug. 22, 2007; and (B) U.S. Provisional No. 60/957,393, filed Aug. 22, 2007. Each of the foregoing patent applications and provisional patent applications is expressly incorporated by reference in its entirety.

In addition, U.S. Pat. No. 8,117,268 is expressly incorporated by reference in its entirety. Each of the following patent application publications are also expressly incorporated by reference in their entireties: U.S. Publication No. 2009/0055175, filed Aug. 22, 2008; U.S. Publication No. 2009/0124272, filed Aug. 25, 2008, now abandoned; and U.S. Publication No. 2009/0083032, filed Sep. 17, 2008.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

COMPUTER PROGRAM LISTING

Submitted concurrently herewith via the USPTO electronic filing system, and incorporated herein by reference, is a computer program listing illustrating instructions, routines, and/or other contents of a computer program. The computer program listing includes two computer files that may be utilized in accordance with an embodiment of the present invention. One file is illustrative code representing an ad filter, and the other file is illustrative code for a dialog screen. A table setting forth the name, size, and last modified date of each file included in the computer program listing is set forth in Table A. The computer program listing includes source code written in Java. The extension of each file should be changed from ".txt" to ".java" for use. Further, each file may have to be reformatted with respect to line breaks before compiling.

TABLE A

| | File Name | Size | Modification Date/Time |
|---|---|---|---|
| 1. | File: code1.txt | 1.20 KB | 9/1712008 5:44:21 PM |
| 2. | File: code2.txt | 33.2 KB | 9/1712008 5:39:37 PM |

BACKGROUND OF THE INVENTION

Both text messaging and instant messaging are forms of personal communication that have grown in popularity and use over the last decade. Aspects and features of the invention are believed to further enable and facilitate the use and acceptance of text messaging and instant messaging with mobile devices.

In this respect, "text messaging" as used herein generally is intended to refer to the sending and receiving of text messages (sometimes abbreviated as "SMSes") via wireless telecommunication systems preferably using a Short Message Service protocol (sometimes abbreviated as SMS). The sending and receiving of such text messages is well known and commonly performed using mobile phones or the like, such as smart phones or PDAs (hereinafter generally referred to as a "mobile device" or "mobile communication device"). Common applications of SMS include person-to-person messaging. However, SMSes also are now used to interact with automated systems, such as ordering products and services for mobile devices or participating in contests using mobile devices such as, for example, voting for contestants in American Idol competitions.

In contrast to text messaging, "instant messaging" (sometimes abbreviated as "1M") as used herein generally is intended to refer to a form of "real-time" communication between two or more people that is based on the transmission of text. The text is conveyed over a network such as the Internet. Instant messaging requires an IM client that connects to an IM service. The 1M client commonly is installed on a computer such as a laptop or desktop. However, 1M clients are now available for use on mobile devices. Because 1M is considered "real-time," communications back and forth between users of 1M clients sometimes is deemed a "conversation," just as if the people were speaking directly to one another.

As will be appreciated by a person having ordinary skill in the relevant art, the line between text messaging and instant messaging is also becoming less clear, as text messaging can be displayed in a threaded SMS context similar to the conventional display of an 1M conversation. Aspects and features of the invention have applicability in both contexts, i.e., in text messaging and in instant messaging, and except where the context clearly implies otherwise, aspects and features of the invention apply in the context of both text messaging systems, methods, applications, and implementations as well as 1M systems, methods, applications, and implementations.

SUMMARY OF THE INVENTION

The present invention includes many aspects and features. Moreover, while many aspects and features relate to, and are described in, the context of instant messaging and SMS messaging, the present invention is not limited to use only in such contexts, as will become apparent from the following summaries and detailed descriptions of aspects, features, and one or more embodiments of the present invention. For instance, aspects and features of the invention are equally useful and applicable in the context of voice mails and emails.

Generally, certain inventive aspects and features of the invention relate to parsing and/or filtering of message strings (text of instant messages or text messages) that are either manually typed, transcribed from speech, or part of a stream web services query, in order to identify keywords, phrases, or fragments that can be monetized. Inventive aspects of the invention further relate to the delivery and presentation of ad impressions that resembles a text message or instant message whereby the advertisement is generally unobtrusive to the author of the message string and/or the recipient of the message string. Inventive aspects and features of the invention also relate to presenting (e.g., displaying and/or playing) advertisements as a text injection, a graphic, video, or audio to one or more users, whether asynchronously or synchronized.

Other aspects and features of the invention pertain to systems, methods, and software for delivering to and/or presenting ad impressions on mobile devices for view by users of the mobile devices in a communication system, wherein the delivery and/or presentation is based at least in part on awareness of time-of-day, week, month, location, weather, and/or seasonality; and/or geographical location and/or proximity. Such systems, methods, and software are utilized in the context of a communication system including text messaging, instant messaging, or both. Furthermore, such communication system preferably includes an automatic speech transcription and filtering system, and the ad impressions are selected based, at least in part, on keywords, phrases, or fragments that are identified in the text that is generated from such system. The ad impression preferably is delivered within a text message or within an instant message conversation and is generally unobtrusive or is incorporated into a user interface of the mobile device. The ad impression further may indicate time-of-day, week, month, weather, seasonality, geographical proximity, and/or location of the mobile device, and the delivery and/or presentation may be based, at least in part, on awareness of time-of-day, week, month, weather, seasonality, geographical proximity, and/or location of the mobile device.

One or more steps of inventive aspects and features of the foregoing inventions may be performed in client and/or server side processing.

In particular detail, one aspect of the present invention relates to a computer-implemented method facilitating the presentation of advertising that relates to a word that is part of the text of a message. The method includes the steps of receiving a message sent from a sender for communication to a recipient, scanning words of the message and identifying words for which advertising is available for delivery, communicating the message to the recipient, and communicating advertising for an identified word of the text of the message for presenting to at least one of the sender and recipient.

In a feature of this aspect of the invention, the message is a text message.

In a feature of this aspect of the invention, the message is an instant message.

In a feature of this aspect of the invention, the method further includes communicating the message to additional recipients and communicating the advertising to the additional recipients.

In a feature of this aspect of the invention, the step of scanning the message and identifying words for which advertising is available includes identifying keywords, phrases and fragments in the message for which contextually relevant advertising is available for pushing to the recipient of the message.

In a feature of this aspect of the invention, the message is a message string.

In a feature of this aspect of the invention, the words that are scanned include keywords, phrases, and fragments of the text of the message.

In a feature of this aspect of the invention, the method further includes determining whether to send an advertising based on demographic, psychometric, or past history of the sender of the message.

In a feature of this aspect of the invention, the method further includes obtaining the advertising from a third party for communicating to the recipient the advertising with the message.

Another aspect of the present invention relates to a method facilitating the presentation of advertising that relates to a word that is part of the text of a message. The method includes the steps of, by a sender, communicating a message for communication to a recipient; by a communications service provider, receiving the message communicated by the sender for communication to the recipient, scanning words of the message, identifying words for which advertising is available for delivery, communicating the message to the recipient, and communicating advertising for an identified word of the text of the message for presenting to at least one of the sender and recipient; and receiving, by the recipient, the message communicated from the service provider.

In a feature of this aspect of the invention, the service provider is a provider of instant messaging services.

In a feature of this aspect of the invention, the method further includes displaying the advertising as an instant message in an instant message chat conversation.

In a feature of this aspect of the invention, the service provider is a provider of text messaging services.

In a feature of this aspect of the invention, the method further includes displaying the advertising as a text message in a threaded text messaging conversation.

In a feature of this aspect of the invention, the message is communicated from a mobile communication device of the sender, and wherein the advertising is communicated to the mobile communication device of the sender.

In a feature of this aspect of the invention, the message and advertising are received by a mobile communication device of the recipient.

In a feature of this aspect of the invention, the method further includes additionally communicating the advertising to a mobile communication device of the sender.

In a feature of this aspect of the invention, the method further includes providing an option to the recipient for forwarding the advertising to the sender wherein the provided option includes forwarding the advertising by at least one of text messaging, instant messaging, and email.

In a feature of this aspect of the invention, the method further includes providing an option to the recipient for forwarding the advertising to the sender, wherein the provided option includes forwarding a hyperlink associated with the advertising.

In a feature of this aspect of the invention, the advertising is displayed such that selection of the displayed advertising results in the launching of a web browser.

Another aspect of the present invention relates to a computer-implemented method facilitating the presentation of advertising that relates to a word that is part of the text of a message. The method includes receiving a message sent from a sender for communication to a recipient; scanning words of the message and identifying words for which an ad impression is available; communicating the message to the recipient; and communicating the ad impression for an identified word of the text of the message for presenting to at least one of the sender and recipient.

In a feature of this aspect of the invention, the message is a text message.

In a feature of this aspect of the invention, the ad impression is presented as a text message in a threaded text message conversation.

In a feature of this aspect of the invention, the message is an instant message.

In a feature of this aspect of the invention, the ad impression is presented as an instant message in an instant message chat conversation.

In a feature of this aspect of the invention, the ad impression includes text, graphics, video, and/or audio.

In a feature of this aspect of the invention, the method further includes comparing ad payouts of a plurality of available ad impressions for the identified word, wherein the ad impression that is communicated is the ad impression having the highest ad payout.

In a feature of this aspect of the invention, the method further includes normalizing ad payout based on a statistically weighted equilibrium of selected parameters, including factors such as relative relevance of the competing ad networks to the demographics, psychometrics, or past history of the sender of the message, wherein the ad impression that is communicated is the most statistically relevant ad impression having the highest ad payout.

In a feature of this aspect of the invention, the method further includes normalizing ad payout based on a statistically weighted equilibrium of selected parameters, including factors such as relative relevance of the competing ad networks to the demographics, psychometrics, or past history of a recipient of the message, wherein the ad impression that is communicated is the most statistically relevant ad impression having the highest ad payout.

In a feature of this aspect of the invention, said step of identifying words for which advertising is available for delivery comprises comparing the text of the message to criteria of ad campaigns of ad networks; communicating a match of criteria of ad campaigns to the respective ad networks of the ad campaigns; receiving ad payouts from the ad networks; and identifying the ad network having the highest ad payout; wherein the ad impression that is communicated is an ad impression from the ad network having the highest ad payout.

In a feature of this aspect of the invention, said step of communicating a match of criteria of ad campaigns to the respective ad networks of the ad campaigns includes communicating to an ad network the text of the message that matches the criteria of the ad campaign of the ad network.

In a feature of this aspect of the invention, said step of communicating a match of criteria of ad campaigns to the respective ad networks of the ad campaigns includes communicating the message to an ad network for which the text of the message matches the criteria of the ad campaign of the ad network.

In a feature of this aspect of the invention, said step of communicating a match of criteria of ad campaigns to the respective ad networks of the ad campaigns includes communicating the message to an ad network for which the text of the message matches the criteria of the ad campaign of the ad network.

In a feature of this aspect of the invention, said step of communicating a match of criteria of ad campaigns to the respective ad networks of the ad campaigns includes communicating demographic, psychometric, and/or other historical profile information of the sender of the message, whereby the ad network may determine an ad impression having the highest semantic context hit based on the unique demographics, psychometrics, or history and may determine an appropriate ad payout level thereof.

In a feature of this aspect of the invention, said step of communicating a match of criteria of ad campaigns to the respective ad networks of the ad campaigns includes communicating demographic, psychometric, and/or other historical profile information of a recipient of the message, whereby the ad network may determine an ad impression having the highest semantic context hit based on the unique demographics, psychometrics, or history and may determine an appropriate ad payout level thereof.

In a feature of this aspect of the invention, the message and advertising are communicated to a mobile communication device of the recipient.

In a feature of this aspect of the invention, the method further includes additionally communicating the advertising to a mobile communication device of the sender.

In a feature of this aspect of the invention, the method further includes providing an option to the recipient for forwarding the advertising to the sender wherein the provided option includes forwarding the advertising by at least one of text messaging, instant messaging, and email.

In a feature of this aspect of the invention, the method further includes providing an option to the recipient for forwarding the advertising to the sender, wherein the provided option includes forwarding a hyperlink associated with the advertising.

In a feature of this aspect of the invention, the advertising is displayed such that selection of the displayed advertising results in the launching of a web browser.

Another aspect of the present invention relates to a computer-implemented method facilitating the presentation of advertising that relates to a word that is part of the text of a message. The method includes the steps of: receiving a message sent from a sender for communication to a recipient; receiving data indicative of the geographical location of at least one of the sender and recipient; determining temporal information of at least one of the sender and recipient based on the received data indicative of the geographical location of the at least one of the sender and recipient; scanning words of the message and identifying words for which advertising is available for delivery; selecting available advertising for communicating based on, in part, the determined temporal information; communicating the message to the recipient; and communicating the selected advertising for presenting to the at least one of the sender and recipient.

In a feature of this aspect of the invention, the message is received from a mobile communication device of the sender; and wherein the advertising is communicated to the sender.

In a feature of this aspect of the invention, the mobile communication device includes GPS capabilities; and wherein said step of receiving data representative of the geographical location of the sender comprises receiving GPS data from the mobile communication device.

In a feature of this aspect of the invention, the message is communicated to a mobile communication device of the recipient; and wherein the advertising is communicated to the recipient.

In a feature of this aspect of the invention, the mobile communication device includes GPS capabilities; and further comprising the step of receiving data representative of the geographical location of the recipient, including receiving GPS data from the mobile communication device of the recipient.

In a feature of this aspect of the invention, the message is communicated to a mobile communication device of the recipient; and wherein the advertising is communicated to the recipient.

In a feature of this aspect of the invention, the mobile communication device includes GPS capabilities; and further comprising the step of receiving data representative of the geographical location of the recipient, including receiving GPS data from the mobile communication device of the recipient.

In a feature of this aspect of the invention, said step of determining temporal information based on, in part, the geographical location comprises determining the current time of day at the geographical location.

In a feature of this aspect of the invention, said step of determining temporal information based on, in part, the geographical location comprises determining the current season at the geographical location.

In a feature of this aspect of the invention, said step of determining temporal information based on, in part, the geographical location comprises determining the current weather at the geographical location.

In a feature of this aspect of the invention, said step of determining temporal information based on, in part, the geographical location comprises determining the day at the geographical location, and whether the day is a holiday.

In a feature of this aspect of the invention, the advertising is an ad impression.

In a feature of this aspect of the invention, the ad impression includes text, graphics, video, and/or audio.

In a feature of this aspect of the invention, the method further includes comparing ad payouts of a plurality of available ad impressions, wherein the ad impression that is communicated is the ad impression having the highest ad payout.

In a feature of this aspect of the invention, the ad impression includes a web address such that selection of the ad impression results in the accessing of a web page at the web address.

In a feature of this aspect of the invention, the method further includes tracking click-through-rates of ad impressions with respect to time of day of the recipient of the ad impression.

In a feature of this aspect of the invention, the method further includes tracking click-through-rates of ad impressions with respect to geographical location of the recipient of the ad impression.

In a feature of this aspect of the invention, the method further includes tracking click-through-rates of ad impressions with respect to season of the recipient of the ad impression.

In a feature of this aspect of the invention, the method further includes tracking click-through-rates of ad impressions with respect to holidays of the recipient of the ad impression.

In a feature of this aspect of the invention, the method further includes tracking click-through-rates of ad impressions with respect to weather of the recipient of the ad impression.

Another aspect of the present invention relates to a method facilitating the presentation of advertising that relates to a word that is part of the text of a message. The method includes the step of, by a sender, communicating a message for communication to a recipient. The method further includes the steps of, by a communications service provider, receiving the message communicated by the sender for communication to the recipient, receiving from a mobile communication device data indicative of the geographical location of at least one of the sender and recipient, determining temporal information of the mobile communication device based on the received data indicative of the geographical location of the mobile communication device, scanning words of the message and identifying words for which advertising is available for delivery, selecting available advertising for communicating based on, in part, the determined temporal information, communicating the message to the recipient, communicating the selected advertising to the mobile communication device, and communicating data indicative of the determined temporal information to the mobile communication device. The method further includes the step of receiving, by the recipient, the message communicated from the service provider. Still further, the method includes, by the mobile communication device, receiving the selected advertising, receiving the data indicative of the determined temporal information, and altering a user interface (UI) displayed by the mobile communication device based on the received data indicative of the determined temporal information such that the UI reflects the determined temporal information. [0075] In a feature of this aspect of the invention, a graphics layer of the UI of the mobile communication device is altered. [0076] In a feature of this aspect of the invention, the UI is altered based on a daily forecast for the determined local area in which the mobile communication device is located.

In a feature of this aspect of the invention, the UI is altered such that, on rainy days the UI includes graphics suggesting rain, and on sunny days the UI includes graphics suggesting sun.

In a feature of this aspect of the invention, the UI is altered to display a logo associated with an advertiser for the selected advertising.

In a feature of this aspect of the invention, the UI is altered to indicate location of the mobile communication device within a predetermined range of an advertiser for the selected advertising.

In a feature of this aspect of the invention, said step of selecting available advertising for communication is further based on, in part, user preferences maintained by the service provider in a user profile for the at least one of the sender and recipient.

In a feature of this aspect of the invention, the mobile communication device includes GPS capabilities; and wherein said step of receiving data indicative of the geographical location of the mobile communication device comprises receiving GPS data from the mobile communication device.

In a feature of this aspect of the invention, said step of determining temporal information based on, in part, the geographical location comprises determining the current time of day at the geographical location.

In a feature of this aspect of the invention, said step of determining temporal information based on, in part, the geographical location comprises determining the current season at the geographical location.

In a feature of this aspect of the invention, said step of determining temporal information based on, in part, the geographical location comprises determining the current weather at the geographical location.

In a feature of this aspect of the invention, said step of determining temporal information based on, in part, the geographical location comprises determining the day at the geographical location, and whether the day is a holiday.

Another aspect of the present invention relates to a method for reflecting temporal information for a location at which a mobile communication device is located. The method includes the steps of, by a communications service provider, receiving from the mobile communication device data indicative of the geographical location of the mobile communication device, determining temporal information of the mobile communication device based on the received data indicative of the geographical location of the mobile communication device, communicating data indicative of the determined temporal information to the mobile communication device. The method further includes the steps, by the mobile communication device, of receiving the data indicative of the determined temporal information, and altering a user interface (UI) displayed by the mobile communication device based on the received data indicative of the determined temporal information such that the UI reflects the determined temporal information.

In a feature of this aspect of the invention, the UI facilitates instant messaging.

In a feature of this aspect of the invention, the UI facilitates text messaging.

In a feature of this aspect of the invention, the mobile communication device includes GPS capabilities; and wherein said step of receiving data indicative of the geographical location of the mobile communication device comprises receiving GPS data from the mobile communication device.

In a feature of this aspect of the invention, said step of determining temporal information based on, in part, the geographical location comprises determining the current time of day at the geographical location.

In a feature of this aspect of the invention, said step of determining temporal information based on, in part, the geographical location comprises determining the current season at the geographical location.

In a feature of this aspect of the invention, said step of determining temporal information based on, in part, the geographical location comprises determining the current weather at the geographical location.

In a feature of this aspect of the invention, said step of determining temporal information based on, in part, the geographical location comprises determining the day at the geographical location, and whether the day is a holiday.

In another aspect of the invention, a method for presenting additional content for a word that is part of a message, and that is presented by a mobile communication device, includes the steps performed by the mobile communication device of: presenting the message, including emphasizing one or more words for which respective additional content is available for presenting by the mobile communication device; receiving an utterance that includes an emphasized word for which additional content is available for presenting by the mobile communication device; and presenting the additional content for the emphasized word included in the utterance received by the mobile communication device, wherein the additional content is advertising.

In a feature of the aspect, the mobile communication device is a phone. [0096] In a feature of the aspect, the advertising is presented by playing audio over a speaker of the mobile communication device.

In a feature of the aspect, said step of presenting the message, including emphasizing one or more words for which respective advertising is available for presenting by the mobile communication device, comprises the step of playing audio of the message on the mobile communication device, wherein the audio includes pronunciation emphasis for the one or more words for which respective advertising is available for presenting by the mobile communication device.

In a feature, said step of presenting the message, including emphasizing one or more words for which respective advertising is available for presenting by the mobile communication device, comprises the step of playing audio of the message on the mobile communication device, wherein the audio includes aural cueing for the one or more words for which respective advertising is available for presenting by the mobile communication device.

In a feature, said step of presenting the message, including emphasizing one or more words for which respective advertising is available for presenting by the mobile communication device, comprises the step of displaying text of the message on the mobile communication device such that the one or more words, for which respective advertising is available for presenting on the mobile communication device, are highlighted. The respective advertising for an emphasized word may be presented by expanding the displayed text of the message to include the respective advertising in conjunction with the emphasized word.

In a feature, the advertising includes a web address, an email address, or geospatial information.

In a feature, the advertising is presented by displaying a video on the mobile communication device.

In a feature, the advertising IS presented III a web browser of the mobile communication device.

In a feature, the advertising IS presented III a popup window of the mobile communication device.

In a feature, a particular word for which respective advertising is available for presenting by the mobile communication device consists of a single word.

In a feature, a particular word for which respective advertising is available for presenting by the mobile communication device comprises a phrase.

In a feature, a particular word for which respective advertising is available for presenting by the mobile communication device comprises an alphanumeric string.

In a feature, the utterance includes a cue indicating that the utterance includes an emphasized word for which respective advertising is available for presenting by the mobile communication device.

In a feature, multiple alternative advertising exist for a particular word that are available for presenting by the mobile communication device, and further includes presenting by the mobile communication device the advertising of each such alternative.

In another feature, the method further includes the steps of receiving non-verbal input by the mobile communication device, which input represents a selection of an emphasized word for which respective advertising is to be presented by the mobile communication device; and presenting, by the mobile communication device, the advertising for the selected word, whereby the advertising may be presented during times when the mobile communication device is unable to successfully receive an utterance.

In a feature, multiple alternative advertising exists for a particular word that are available for presenting by the mobile communication device, and further includes the steps of selecting and presenting one of the alternative advertising. The step of selecting one of the alternative advertisements may be performed by a user of the mobile communication device, or may be performed in accordance with a computer algorithm.

In another aspect of the invention, a method for presenting advertising for a word that is part of a message and that is presented by a mobile communication device, includes the steps performed by the mobile communication device of: presenting the message, including emphasizing one or more words for which respective advertising is available for presenting by the mobile communication device; communicating an utterance for transcription, the utterance being received by the mobile communication device and including an emphasized word that is presented and for which advertising is available for presenting by the mobile communication device; receiving a transcription of the utterance, including a textual representation of the emphasized word; and based on the textual representation of the emphasized word, presenting the advertising for such emphasized word.

In a feature, said step of communicating an utterance for transcription includes recording the utterance and sending audio data representing the recorded utterance.

In a feature, said step of communicating an utterance for transcription includes streaming a recording of the utterance.

In a feature, the respective advertising for each of the emphasized words that is presented by the mobile communication device is received by and stored in the mobile communication device before the transcription of the utterance is received by the mobile communication device. The respective advertising in this respect is stored in a memory of the mobile communication device in association with the emphasized word to which the advertising pertains, with the advertising that is presented being based on a match of the textual representation of the emphasized word with the emphasized words stored in the memory of the mobile communication device.

In a feature, the mobile communication device is a phone.

In a feature, said step of presenting the message, including emphasizing one or more words for which respective advertising is available for presenting by the mobile communication device, comprises the step of playing audio of the message on the mobile communication device, wherein the audio includes pronunciation emphasis or aural cueing for the one or more words for which respective advertising is available for presenting by the mobile communication device.

In a feature, said step of presenting the message, including emphasizing one or more words for which respective advertising is available for presenting by the mobile communication device, comprises the step of displaying text of the message on the mobile communication device such that the one or more words, for which respective advertising is available for presenting on the mobile communication device, are highlighted.

In another aspect of the invention, a method for presenting advertising for a word that is part of a message and that is presented by a mobile communication device, the steps performed by the mobile communication device of: presenting the message, including emphasizing one or more words for which respective advertising is available for presenting by the mobile communication device; communicating an utterance for transcription, the utterance being received by the mobile communication device and including an emphasized word that is presented and for which advertising is available for presenting by the mobile communication device; in response to communicating the utterance for transcription, receiving the advertising for the emphasized word; and presenting the advertising received for the emphasized word.

In a feature, said step of communicating an utterance for transcription includes recording the utterance and sending audio data representing the recorded utterance. [00120] In a feature, said step of communicating an utterance for transcription includes streaming a recording of the utterance.

In a feature, said step of presenting the message, including emphasizing one or more words for which respective advertising is available for presenting by the mobile communication device, comprises the step of playing audio of the message on the mobile communication device, wherein the audio includes pronunciation emphasis or aural cueing for the one or more words for which respective advertising is available for presenting by the mobile communication device.

In a feature, said step of presenting the message, including emphasizing one or more words for which respective advertising is available for presenting by the mobile communication device, comprises the step of displaying text of the message on the mobile communication device such that the one or more words, for which respective advertising is available for presenting on the mobile communication device, are highlighted.

In another aspect of the invention, a method for presenting advertising for a word that is part of a message and that is presented by a mobile communication device, includes the steps performed by the mobile communication device of: presenting the message, including emphasizing one or more words for which respective advertising is available for presenting by the mobile communication device; communicating an utterance for transcription, the utterance being received by the mobile communication device and including an emphasized word that is presented and for which advertising is available for presenting by the mobile communication device; in response to communicating the utterance for transcription, receiving additional content data for the emphasized word; and presenting the advertising for the emphasized word based on the received additional content data.

The additional content data may include a web address, and the step of presenting the advertising for the emphasized word based on the received additional content data comprises opening the web address in a web browser of the mobile communication device. The step of communicating an utterance for transcription may include recording the utterance and sending audio data representing the recorded utterance, or the step of communicating an utterance for transcription may include streaming a recording of the utterance.

The step of presenting the message, including emphasizing one or more words for which respective advertising is available for presenting by the mobile communication device, may include the step of playing audio of the message on the mobile communication device, wherein the audio includes pronunciation emphasis or aural cueing for the one or more words for which respective advertising is available for presenting by the mobile communication device, or the step of presenting the message, including emphasizing one or more words for which respective advertising is available for presenting by the mobile communication device, may include the step of displaying text of the message on the mobile communication device such that the one or more words, for which respective advertising is available for presenting on the mobile communication device, are highlighted.

In another aspect of the invention, a method facilitating the presentation of advertising for a word that is part of a transcribed utterance intended for a message, includes the steps of, first: receiving audio data communicated from a mobile communication device, the audio data representing an utterance that is intended to be at least a portion of the text of a message that is to be sent from the mobile communication device to a recipient; transcribing the utterance to text based on the audio data; scanning words of the transcribed text and identifying words for which respective advertising is available; communicating the transcribed text with the identified words to the mobile communication device such that the identified words are emphasized when the text is presented by the mobile communication device; and maintaining in a database an association between the identified words, the respective advertising corresponding to the identified words, and an identifier of the mobile communication device. The method includes the steps of, thereafter, receiving audio data communicated from the mobile communication device, the audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective advertising to the mobile communication device that is maintained in the database in association with an identified word found in the transcribed text based on the comparing.

In a feature, said step of communicating to the mobile communication device the respective advertising that is maintained in the database in association with an identified word included in the transcribed text includes communicating to the mobile communication device the respective advertising that is maintained in the database in association with each identified word that is found in the transcribed text based on the comparing.

In a feature, the step of identifying words for which respective advertising is available comprises highlighting the words such that the words are emphasized when displayed on the mobile communication device.

In a feature, the step of identifying words for which respective advertising is available comprises configuring an audio presentation of the transcription to include pronunciation emphasis of the words for which respective advertising is available.

In a feature, the step of identifying words for which respective advertising is available comprises configuring an audio presentation of the transcription to include aural cueing for the words for which respective advertising is available.

In a feature, the audio data that is received from the mobile communication device representing an utterance that is intended to be at least a portion of the text of a message is received with an indication of the type of message. The indication may be that the message is an instant message, or that the message is to be sent from the mobile communication device in accordance with a text messaging protocol. The method further may include filtering the transcribed text based on the indication.

In another aspect of the invention, a method facilitating the presentation of advertising for a word that is part of a transcribed utterance intended for a message, includes the steps of, first: receiving audio data communicated from a mobile communication device, the audio data representing an utterance that is intended to be at least a portion of the text of a message that is to be sent from the mobile communication device to a recipient; transcribing the utterance to text based on the audio data; scanning words of the transcribed text and identifying words for which respective advertising is available; communicating the transcribed text with the identified words to the mobile communication device such that the identified words are emphasized when the text is presented by the mobile communication device; and maintaining in a database an association between the identified words, respective additional content data for such words, and an identifier of the mobile communication device. The method further includes the steps of, thereafter, receiving audio data communicated from the mobile communication device, the audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content data to the mobile communication device that is maintained in the database in association with an identified word found in the transcribed text based on the comparing.

In a feature, the additional content data comprises a web address for passing to a web browser of the mobile communication device. [00134] In a feature, the additional content data comprises a URL for retrieving the advertising for presentation by the mobile communication device.

In a feature, said step of receiving audio data communicated from the mobile communication device, the audio data representing an utterance that includes an identified word that is maintained in the database in association with the identifier of the mobile communication device, comprises receiving audio data representing an utterance that further includes a cue that an identified word is included in the utterance for presenting the advertising for such identified word.

In a feature, the association between the identified words, respective additional content data for such words, and an identifier of the mobile communication device is maintained in the database for an extended period of time includes a plurality of days or weeks, whereby advertising may be provided for an identified word communicated to the mobile communication device even though a plurality of days have passed since the identified word was communicated to the mobile communication device.

In another aspect of the invention, a method of facilitating the presentation of advertising for a word that is part of a transcribed utterance intended for a message includes the steps of, first: receiving audio data communicated from a mobile communication device, the audio data representing an utterance that is intended to be at least a portion of the text of a message that is to be sent from the mobile communication device to a recipient; transcribing the utterance to text based on the audio data; identifying the words for which respective advertisements are available; communicating the transcribed text with the identified words to the mobile communication device such that the identified words are emphasized when the text is presented by the mobile communication device; and maintaining in a database an association between the identified words, respective advertising data for such words, and an identifier of the mobile communication device; thereafter, receiving audio data communicated from the mobile communication device, the audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; retrieving the respective advertising corresponding to the identified word by utilizing the additional content data maintained in the database in association with an identified word found in the transcribed text based on the comparing; and communicating the retrieved advertising to the mobile communication device. The additional content data may be a web address or a URL for retrieving the advertising.

In another aspect, a method for presenting advertising for a word that is part of a message, and that is presented by a mobile communication device, includes the steps of: first, by a server, receiving an identifier of the mobile communication device and audio data communicated from the mobile communication device, the audio data representing an utterance that is intended to be at least a portion of the text of a message that is to be sent from the mobile communication device to a recipient; transcribing the utterance to text based on the audio data; scanning words of the transcribed text and identifying words for which respective advertising is available; communicating the transcribed text with the identified words to the mobile communication device such that the identified words are emphasized when the text is presented by the mobile communication device; and maintaining in a database an association between the identified words, the respective advertising available for the identified words, and an identifier of the mobile communication device. The method includes next the step, by the mobile communication device, of presenting the message, including emphasizing the identified words for which the respective advertising is available for presenting by the mobile communication device; and then the steps, by the server, of receiving an identifier of the mobile communication device and audio data communicated from the mobile communication device, the audio data representing an utterance received by the mobile communication device, the utterance including an identified word that is maintained in the database in association with the identifier of the mobile communication device; transcribing the utterance to text based on the audio data; comparing the transcribed text to the identified words maintained in the database in association with the identifier of the mobile communication device; and communicating the respective advertising to the mobile communication device that is maintained in the database in association with an identified word found in the transcribed text based on the comparing. The method then includes the step, by the mobile communication device, of presenting the advertising received from the server.

In a feature, said step of communicating to the mobile communication device the respective advertising that is maintained in the database in association with an identified word included in the transcribed text includes communicating to the mobile communication device the respective advertising that is maintained in the database in association with each identified word that is found in the transcribed text based on the comparing, and the step of presenting the advertising received from the server by the mobile communication device comprises presenting each respective advertising received from the server.

In a feature, the step of identifying words for which respective advertising is available comprises highlighting the words such that the words are emphasized when displayed on the mobile communication device.

In a feature, the step of identifying words for which respective advertising is available comprises configuring an audio presentation of the transcription to include pronunciation emphasis of the words for which respective advertising is available.

In a feature, the step of identifying words for which respective advertising is available comprises configuring an audio presentation of the transcription to include aural cueing for the words for which respective advertising is available.

In a feature, the audio data that is received from the mobile communication device representing an utterance that is intended to be at least a portion of the text of a message is received with an indication of the type of message. The indication may indicate that the message is an instant message; or that the message is to be sent from the mobile communication device in accordance with a text messaging protocol. The method may further include filtering the transcribed text based on the indication.

In another aspect of the invention, a method facilitating the presentation of advertising for a word that is part of a transcribed utterance intended for a message includes the steps of, first, by a server, receiving an identifier of the mobile communication device and audio data communicated from the mobile communication device, the audio data representing an utterance that is intended to be at least a portion of the text of a message that is to be sent from the mobile communication device to a recipient; transcribing the utterance to text based on the audio data; scanning words of the transcribed text and identifying words for which respective advertising is available; communicating the transcribed text with the identified words to the mobile communication device such that the identified words are emphasized when the text is presented by the mobile communication device; and maintaining in a database an association between the identified words, respective advertising data for such words, and an identifier of the mobile communication device. The method includes, next, the steps performed by the mobile communication device of presenting the message, including emphasizing the identified words for which the respective advertising is available for presenting by the mobile communication device. The method then includes the steps, performed by a server, of receiving an identifier of the mobile communication device and audio data communicated from the mobile communication device, the audio data representing an utterance received by the mobile communication device, the utterance including an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content data to the mobile communication device that is maintained in the database in association with an identified word found in the transcribed text based on the comparing. The method then includes the steps, performed by the mobile communication device, of presenting the advertising based on the additional content data received from the server.

In a feature, the additional content data comprises a web address, and the step of presenting the advertising based on the received additional content data comprises opening the web address in a web browser of the mobile communication device.

In a feature, the additional content data comprises a URL for retrieving the advertising for presentation by the mobile communication device, and the step of presenting the advertising based on the received additional content data comprises passing the URL to an appropriate application of the mobile communication device.

In a feature, said step of receiving audio data communicated from the mobile communication device, the audio data representing an utterance that includes an identified word that is maintained in the database in association with the identifier of the mobile communication device, comprises receiving audio data representing an utterance that further includes a cue that an identified word is included in the utterance for presenting the advertising for such identified word.

In a feature, the association between the identified words, respective additional content data for such words, and an identifier of the mobile communication device is maintained in the database for an extended period of time includes a plurality of days or weeks, whereby advertising may be provided for an identified word communicated to the mobile communication device even though a plurality of days have passed since the identified word was communicated to the mobile communication device.

In a feature, said step of presenting the message, including emphasizing the identified words for which respective advertising is available for presenting by the mobile communication device, comprises the step of playing audio of the message on the mobile communication device, wherein the audio includes pronunciation emphasis for the identified words for which respective advertising is available for presenting by the mobile communication device.

In a feature, said step of presenting the message, including emphasizing the identified words for which respective advertising is available for presenting by the mobile communication device, comprises the step of playing audio of the message on the mobile communication device, wherein the audio includes aural cueing for the identified words for which respective advertising is available for presenting by the mobile communication device.

In a feature, said step of presenting the message, including emphasizing the identified words for which respective advertising is available for presenting by the mobile communication device, comprises the step of displaying text of the message on the mobile communication device such that the identified words, for which respective advertising is available for presenting on the mobile communication device, are highlighted.

In another aspect of the invention, a method facilitating the presentation of advertising for a word that is part of the text of a message presented by a mobile communication device includes the steps of, first: scanning words of the message and identifying words for which respective advertising is available; communicating the identified words to the mobile communication device such that the identified words are emphasized when the text of the message is presented by the mobile communication device; and maintaining in a database an association between the identified words, the respective advertising corresponding to the identified words, and an identifier of the mobile communication device to which the identified words were communicated. The method further includes the steps of, thereafter, receiving from the mobile communication device to which the identified words were communicated the identifier of the mobile communication device and audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective advertising to the mobile communication device that is maintained in the database in association with an identified word found in the transcribed text based on the comparing.

In a feature, the mobile communication device is a mobile phone.

In a feature, the step of identifying words for which respective advertising is available comprises highlighting the words such that the words are emphasized when displayed on the mobile communication device.

In a feature, the step of identifying words for which respective advertising is available comprises configuring an audio presentation of the transcription to include pronunciation emphasis of the words for which respective advertising is available.

In a feature, the step of identifying words for which respective advertising is available comprises configuring an audio presentation of the transcription to include aural cueing for the words for which respective advertising is available.

In a feature, the message is an instant message and the mobile communication device is the recipient of the instant message.

In a feature, the message is an instant message and the mobile communication device is the sender of the instant message. [00159] In a feature, the message is a text message and the mobile communication device is the recipient of the text message. [00160] In a feature, the message is a text message and the mobile communication device is the sender of the text message.

In another aspect of the invention, a method facilitating the presentation of advertising for a word that is part of the text of a message presented by a mobile communication device includes the steps of, first: scanning words of the message and identifying words for which respective advertising is available; communicating the identified words to the mobile communication device such that the identified words are emphasized when the text of the message is presented by the mobile communication device; and maintaining in a database an association between the identified words, respective additional content data for such words, and an identifier of the mobile communication device to which the identified words were communicated. The method includes the steps of, thereafter: receiving from the mobile communication device to which the identified words were communicated the identifier of the mobile communication device and audio data representing an utterance that includes an identified word that is maintained in the database in association with the identifier of the mobile communication device; transcribing the utterance to text based on the audio data; comparing the transcribed text to the identified words maintained in the database in association with the identifier of the mobile communication device; and communicating the respective additional content data to the mobile communication device that is maintained in the database in association with an identified word found in the transcribed text based on the comparing.

In a feature, the additional content data comprises a web address for passing to a web browser of the mobile communication device.

In a feature, the additional content data comprises a URL for retrieving the advertising for presentation by the mobile communication device.

In a feature, said step of receiving audio data communicated from the mobile communication device, the audio data representing an utterance that includes an identified word that is maintained in the database in association with the identifier of the mobile communication device, comprises receiving audio data representing an utterance that further includes a cue that an identified word is included in the utterance for presenting the advertising for such identified word.

In a feature, the association between the identified words, respective additional content data for such words, and an identifier of the mobile communication device is maintained in the database for an extended period of time includes a plurality of days or weeks, whereby advertising may be provided for an identified word communicated to the mobile communication device even though a plurality of days have passed since the identified word was communicated to the mobile communication device.

In a feature, the steps of the method are performed by a text messaging service provider.

In a feature, the steps of the method are performed by an Instant Messaging service provider.

In a feature, said step of communicating the identified words to the mobile communication device such that the identified words are emphasized when the text of the message is presented by the mobile communication device includes communicating the text of the message with the identified words to the mobile communication device.

It will be appreciated that one or more aspects of the present invention may be applicable in a voicemail context. More specifically, a voicemail comprising a recorded utterance may be received and transcribed to text. The text may then be scanned for words for which advertising is available. The text may then be displayed to a user together with advertising, or alternatively the words for which advertising is available may be highlighted. This display may be accomplished, for example, through a webpage or via a text message.

In addition to the aforementioned aspects and features of the present invention, it should be noted that the present invention further encompasses the various possible combinations and sub combinations of such aspects and features.

BRIEF DESCRIPTION OF THE DRAWINGS

Further aspects, features, embodiments, and advantages of the present invention will become apparent from the following detailed description with reference to the drawings, wherein:

FIG. 4 is a transcription of a chronological sequence of communications, between the two users, that transpires using the mobile phones and the portion of the communication system shown in FIG. 3;

DETAILED DESCRIPTION OF THE PREFERRED EMBODIMENT

Figure 1:
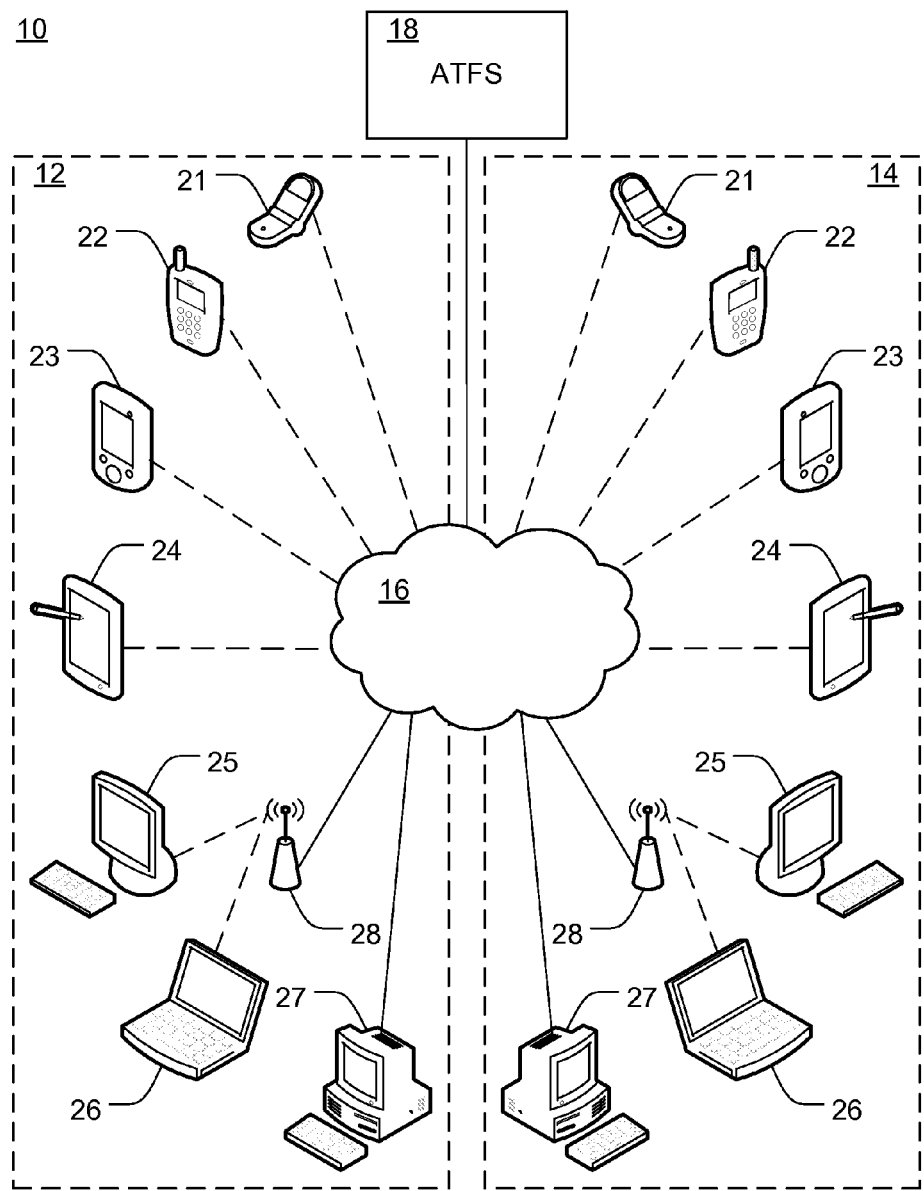
FIG. 1 is a diagram of a communication system in which one or more preferred embodiments of the invention may be practiced.

As a preliminary matter, it will readily be understood by one having ordinary skill III the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein-as understood by the Ordinary Artisan based on the contextual use of such term-differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

Moreover, as will be appreciated from the following detailed description of various embodiments and implementations of the invention, advertisements are shown between or within text messaging threads or instant messaging chat threads. The advertisements are targeted to a particular user based on relevant keywords or phrases that are contained within text messages sent via text messaging or instant messaging that are sent and/or received by such user.

Specifically, messages sent between users (or even from a user to web services via a chat or SMS interface) are passed through one or more client or server based advertising filters. The advertising filters utilize, for example, audio fingerprinting, keyword or grammar lookups, natural language understanding, semantic analysis, or other technique in order to derive interestingness for further processing. The advertising filters are applied either client side or server side, and the identification of such keywords, phrases or fragments are performed and based on such identification-further action is taken in order to present relevant advertising to a user of the mobile device.

The advertising filters preferably include one or more databases of keywords, phrases, and semantic or statistically similar patterns. In passing the messages and, in particular, the words of a message, through such advertising filters, an algorithm or comparison routine is utilized to identify those keywords, phrases or fragments in the messages that can be monetized, i.e., those words for which contextually relevant advertisement is available or likely may be available for pushing to one or more mobile devices.

Furthermore, the advertising filters may be applied during the process of converting audio to text at a location remote to a mobile device, as disclosed in U.S. Patent Appl. Pub. No. US 2007/0239837. In such scenario, advertising may be delivered to mobile devices prior to messages actually being sent to recipients or to web services, as applicable.

Alternatively, advertising filters may be applied to messages when messages are sent as either text messages or instant messages, whereupon advertising filters are applied and contextually relevant advertisement are delivered to the sender of the message, recipient of the message, or both.

Advertising that is delivered to a mobile device for presentation preferably is pushed to the mobile device and such advertising preferably comprises an ad impression and may be displayed to the user in the form of an ad bubble. The ad impression elements may contain text, graphics, videos, and/or audio and may be downloaded from a server infrastructure or may already be resident within the mobile device and accessed directly there from. Preferably, each ad impression is designed to be as unobtrusive as possible to the user and allows the user to view or hear the advertisement or take some further action regarding the advertisement, as desired by the user, which may include opening a separate mobile browser with additional content relevant to the advertisement.

The ad impression may be delivered only to the author of the message. Alternatively, the ad impression may be delivered both to the author of the message and to the intended recipient of the message, especially where the message is intended to be sent to mobile device of another user. The determination of whether to send the ad impression further may be made on a case-by-case basis as a function of demographic, psychometric, or past history of the sender and each intended recipient. Moreover, if the ad impression is sent to either of, but not both of, the author and intended recipient, then such person may be provided with the option of conveniently forwarding the ad impression to the other person if desired, whether by text message, instant message, email, hyperlink, or injection of the ad impression into a message itself.

In taking further action with regard to an ad impression that is presented to a user, such user having seen or heard the ad impression may manually click on a displayed advertisement or portion thereof resulting in, for example, the launching of a mobile browser. The mobile browser may then allow the user to either complete a purchase or find relevant information associated with the advertisement. Moreover, rather than manually clicking on the displayed advertisement, the user may speak a keyword as a "voice click" in accordance with the disclosure of U.S. Ser. No. 12/198,116 and any corresponding U.S. application publication thereof, both of which are incorporated herein by reference, thereby resulting in the further action being taken.

The ad impressions are obtained from third parties by the party that provides the "voice to text" service and/or the text messaging service and/or the instant messaging service (sometimes referred to herein as a "Provider"). Furthermore, such presentation of ad impressions may be performed for a fee, whereby a revenue generating business model is enabled for the Provider.

Further in this respect, ad payout levels for ad impressions preferably are compared if an identified keyword, phrase, or fragment matches the criteria of ad campaigns of two or more competitive ad networks supplying ad impressions to the Provider. Once such keyword, phrase, or fragment is identified within a message, the keyword, phrase, or fragment, a representative identifier thereof, or the full original message, is published or otherwise communicated to the multiple ad networks. At that point, the Provider preferably requests current ad payout levels for pushing an ad impression to the particular author and/or intended recipient of the message, and the ad impression having the highest ad payout level then preferably is selected for use, thereby resulting in the highest revenue per ad impression being obtained by the Provider. Such comparing and selection of ad impressions from competing suppliers preferably is accomplished using client side algorithms or server side algorithms of the Provider, which algorithms dynamically compare ad payout levels when relevant keywords, fragments, or phrases are identified message strings of text messages or instant messages.

The comparison of ad payout levels further may be normalized based on the statistically weighted equilibrium of selected parameters, including factors such as relative relevance of the competing ad networks to the demographics, psychometrics, or past history of the author and/or intended recipient of the message string. After such comparison is made, the most statistically relevant ad impression with the highest ad payout level may be selected for delivery by the Provider. Moreover, the demographic, psychometric, and/or other historical profile information of the author and/or intended recipient of the message string may be published or otherwise communicated to the ad networks, whereby each ad network may determine an ad impression having the highest semantic context hit based on the unique demographics, psychometrics, or history and the appropriate ad payout level thereof for communication to the Provider.

Figure 6:
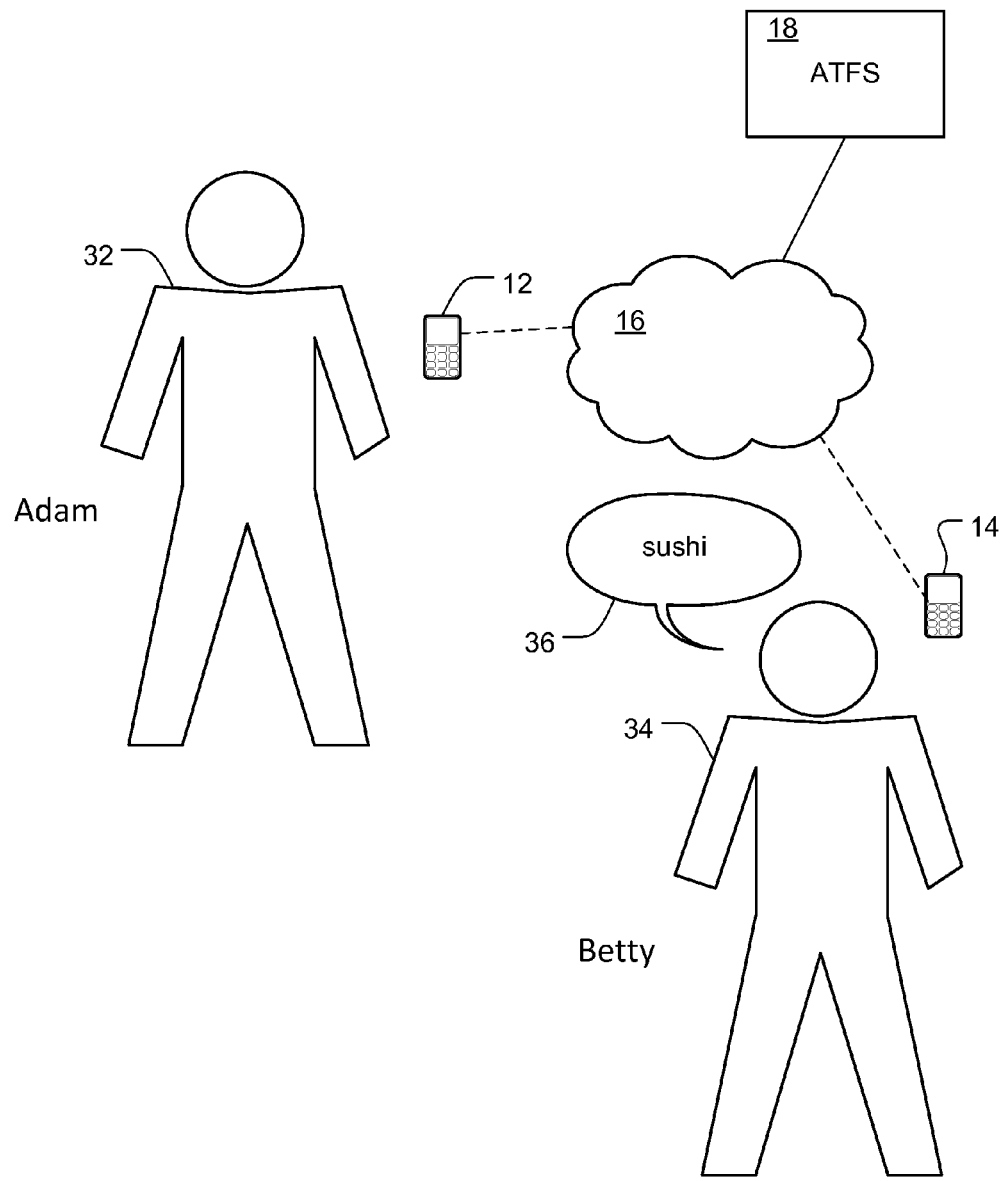
FIG. 6 is a diagram illustrating the second user utilizing a "voice click" feature in accordance with a preferred embodiment of the invention.
Figure 7:
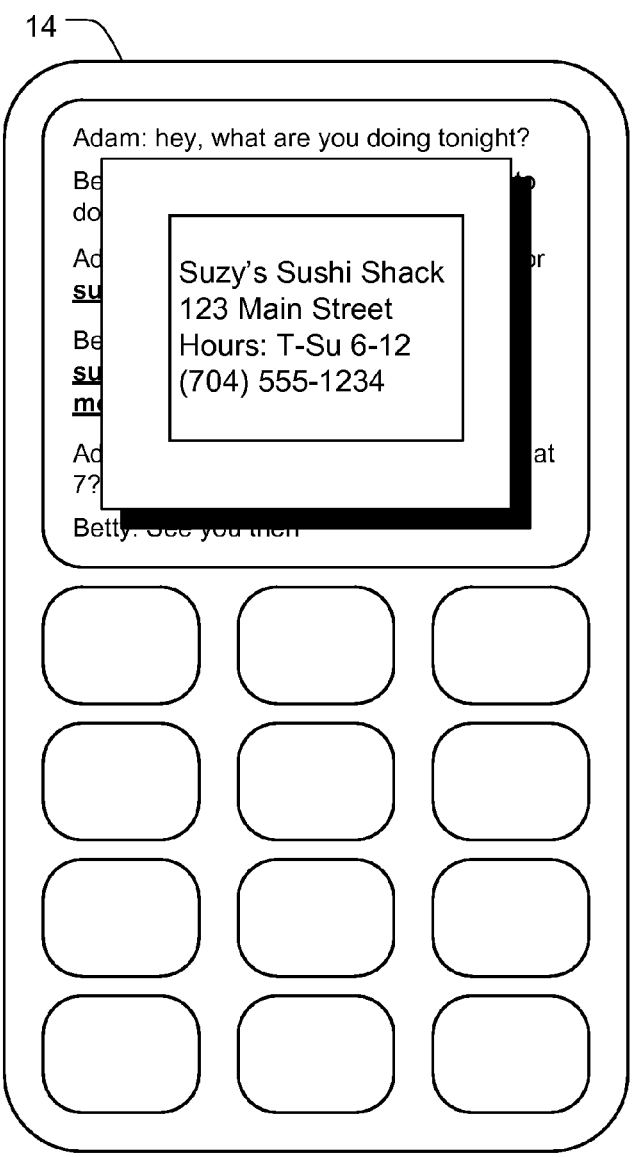
FIG. 7 is a is graphical illustration of the result of the second user utilizing the "voice click" feature as it might appear on the user's mobile phone.

Additionally, in at least one embodiment, a database of particular words for which advertising is available is maintained by the Provider. More particularly, particular words of interest are listed in a database together with any additional content data which an interested party has an interest in being associated with the particular word. For example, a movie theater chain, a movie theater chain, a particular movie theater, a film studio, a movie distributor or a video store may have an interest in particular advertising relating to their respective business being associated with every occurrence of the word "movie" in a message, such that the advertising is provided when such word is selected by a user. In the illustrated example, Suzy's Sushi Shack may have an interest in its advertising being associated with the word "sushi," such that selection of the word "sushi" as shown in FIG. 6 causes such advertising to be presented to the user as shown in FIG. 7.

User preferences may be utilized in this regard. For example, a user may be able to select types of information, for example from a list, that the user might be interested in. Such categories may include but are not limited to "movies," "dining," "retail stores," and the like. In such an arrangement, the word "sushi" might not be activated or highlighted if the user does not have "dining" or any other category selected for association with additional content.

When user preferences are considered, advertising that is available includes advertising that is appropriate for the intended client device, i.e., advertising that is associated with an identified word still may not be "available" if it is excluded by one or more user preferences that have been set.

Additional data may also be combined with any of the foregoing. For example, the location of one or both devices 12,14, available via GPS enablement and the like, may be taken into consideration. Thus, a movie theater chain may have an interest in having information about the movie theater, in the chain, that is geographically closest to the device 12,14 being associated with the word "movie," and Suzy's Sushi Shack, which may only have one location, may have an interest in having information about its single restaurant being associated with the word "sushi" only if the device is within a predetermined distance from that location. User preferences may be utilized here as well, for example to control the distance (radius) within which the user has an interest in associated information.

Other that may be performed include a search, for a particular movie, of movie listings for a theater that is nearby the location of the mobile phone; a search, for a particular business name or for a particular category, of business listings that are proximate the location of the mobile phone; a search of song titles for a particular song; a search of book titled for a particular book; a search of stock ticker symbols for a particular stock ticker symbol; a search of sports teams and scores for a particular sports team; a search of a map for an image or directions for a particular address or zip code; and a search of flight information for a particular flight.

As an example, if two or more users are chatting using an 1M client or texting one another using SMSes, and a user communicates "please meet me for coffee at one", then as the message passes through a server based advertising filter (or in other embodiments, the client based advertising filter), "coffee" may be identified as a "monetizing" keyword. The software of the Provider then queries ad campaigns #1, #2, #3, etc., from multiple ad networks; chooses the ad impression with the highest revenue per impression payout and that perhaps has geographical relevance (e.g., an ad impression for Caribou Coffee may pay more but not exist in the user's geography); and delivers the chosen ad impression by showing an ad bubble stating "Find a Starbucks Coffee nearby!" that is obtained from one of the ad campaigns to either the sender of the message string, the receiver of the message string, or both, along with the original message string. Both the sender and receiver could then click on the displayed advertisement, for example, to find the nearest coffee house via a mobile browser page, or to launch an application residing on the mobile device that maps locations based on zip codes or GPS data. Furthermore, revenue could be generated not only for ad impression delivery, but also for each click generated by the delivered ad impression.

It thus will be appreciated that one or more aspects and features of the present invention provide for the targeted delivery of contextually relevant ad impressions to a mobile device where the ad impressions are delivered within text messages and/or 1M chat threads. Furthermore, it will be appreciated that one or more aspects and features of the present invention enable monetizing of text messaging and instant messaging by providers of such services while providing unobtrusive and contextually relevant information to users of such services.

In addition to the foregoing, further aspects and features of the invention include the delivery and/or presentation of advertisements to user mobile devices based on temporal factors such as the time of day, location aware geo-tagging, season/holidays, and/or weather conditions. In this respect, the ads would pull from ongoing ad campaigns containing additional logic making them either time aware (e.g., showing a Starbucks coffee advertising only in the morning between the hours of 7 A.M. and 9 A.M.); location aware (e.g., showing a household cleaning advertisement only when the user was at home or receiving an ad impression for a bank when the user would approach within x miles proximity of a banking center); season aware (e.g., showing a Christmas sale advertisement only during the holidays); or weather aware (e.g., showing an advertisement for a convertible automobile only during sunny days). Such awareness could further include awareness of holidays, such as, for example, Christmas Day, New Year's Day, and Independent Day.

Such additional customization of ad delivery and presentation provides advertisers additional advantages in being able to target campaigns to users when they are in the most receptive state to targeted advertisements.

In addition, having the ability to target mobile advertising based on location, time and season awareness in accordance with this further invention can reveal further insights to the effectiveness of advertising impressions and/or campaigns not only by simply being able to study standard ad conversion rates or click-through-rates (CTR), but also by tracking CTR as a function of time-of-day, location, season, holidays, and/or weather whereby the delivery and/or presentation of ad impressions can be fine tuned to gain greater effectiveness and efficiency. It is believed that such level of control has previously been unavailable to advertisers and ad campaign managers because marketers cannot easily trace when or where users are located when advertisements are delivered.

Still yet, in addition to delivering ad impressions within text messages and/or instant messages based on such awareness, it is further contemplated in aspects and features of this further invention that the graphics layer of the user interface (UI) of mobile devices that is presented to users can be adapted or morphed based on such awareness in order to provide information or advertising in a graphical format. For example, the user interface may change, based on daily forecast for the local area of the mobile device, such that on rainy days the UI would incorporate graphics indicating or suggesting rain (a "weather" UI).

Alternatively or in conjunction therewith, the UI may receive a partner user interface or logo for display when the user (i.e., the user's mobile device) is within a predetermined range (e.g., a predetermined radius in miles of an ad partner) by using GPS capabilities (or other locating identifying capabilities) of the mobile device or communications network of the mobile device in conjunction with a local or remote database containing GPS coordinates of ad partners. For example, if the user (i.e., the user's mobile device) is determined to be within three miles of an ad partner (i.e., within a circle surrounding the ad partner that has a three mile radius), such as a bank branch, then the bank logo would appear in the user interface so that the user would be alerted to the fact that a branch of the bank was nearby. Similarly, if multiple competing bank branches were located within two miles of a user's mobile device in a city such as New York, then the bank paying the highest ad rate would be selected and displayed as part of the UI to the user in order to inform the user of the close proximity of the bank branch. Alternatively, if the user had an account at one of the banks, as identified in a user profile, then that bank where the user has the account would be selected and displayed as part of the UI.

Turning now to FIG. 1, a diagram of a communication system 10 is illustrated in which one or more preferred embodiments of the invention may be practiced. As shown therein, the communication system 10 includes at least one transmitting device 12 and at least one receiving device 14, one or more network systems 16 for connecting the transmitting device 12 to the receiving device 14, and an automatic transcription and filtering system ("ATFS") 18, including a voice-to-text or automatic speech recognition ("ASR") engine. Transmitting and receiving devices 12,14 may include mobile phones 21, smart phones 22, PDAs 23, tablet notebooks 24, various desktop and laptop computers 25,26, 27, two-way pagers, and other mobile communication devices and the like. One or more of the devices 12,14, such as the illustrated iMac and laptop computers 25,26, may connect to the network systems 16 via wireless access points 28. The various transmitting and receiving devices 12,14 (one or both types of which being sometimes referred to herein as "client devices") may be of any conventional design and manufacture.

It will be appreciated that FIG. 1 is intended primarily to provide context in which inventive aspects and features of the present invention may be practiced. Furthermore, in the context of text messaging, the communication system 10 preferably includes, inter alia, a telecommunications network. In the context of instant messaging, the communications systems 10,60 each preferably includes, inter alia, the Internet and an Instant Messaging (IM) service provider and associated server.

Figure 2:
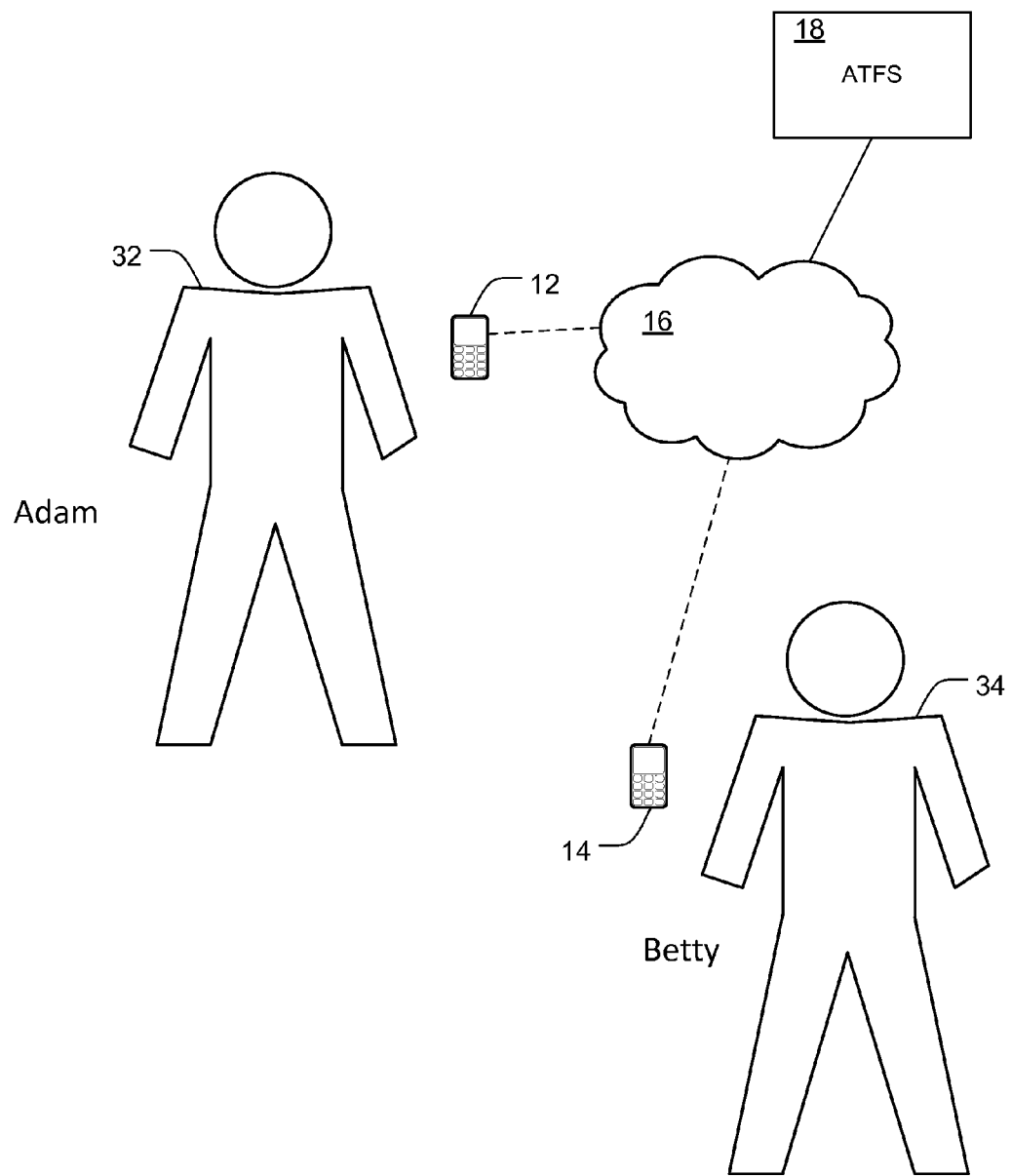
FIG. 2 is a diagram illustrating two users having respectively mobile phones that can be used to communicate back and forth using a portion of the communication system of FIG. 1.
Figure 3:
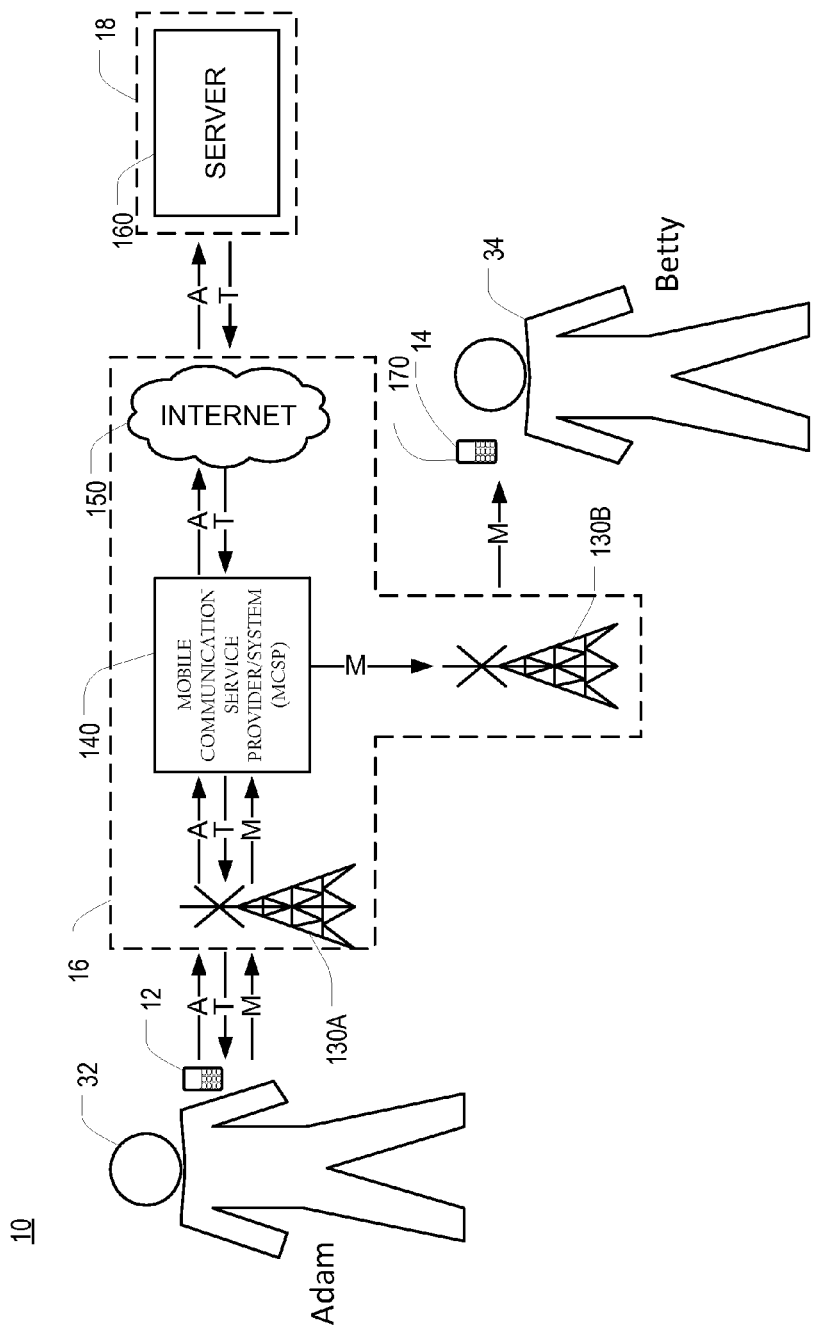
FIG. 3 is a diagram of the portion of the communication system of FIG. 1 over which the users communicate.

FIG. 2 is a diagram illustrating two users 32,34 having respective mobile phones 12,14 that can be used to communicate back and forth using a portion of the communication system of FIG. 1. A more detailed view of the portion of the communication system 10 is illustrated in FIG. 3, which is a diagram of the portion of the communication system of FIG. 1 over which the users 32,34 communicate. As shown therein, a first user 32, sometimes referred to herein as "Adam," communicates with a second user 34, sometimes referred to herein as "Betty," by way of respective handheld communication devices 12,14. More particularly, Adam and Betty exchange text messages using their mobile phones, each phone having a microphone, a speaker, and a display. In the context of text messaging, mobile phones include text messaging applications when sold at retail, and carriers typically charge a small fee for each text message that is sent. The text messages typically are sent using the short message service (SMS) protocol.

The text messages that are sent preferably are generated by speaking into the mobile phones, with the utterances being converted to text by the ATFS 18 in accordance with the disclosure of U.S. Patent Appl. Pub. No. US 2007/0239837. In such disclosure, the ATFS 18 is implemented in one or more backend servers 160, and the one or more network systems 16 include transceiver towers 130; one or more mobile communication service providers 140; and the Internet 150.

Moreover, III converting utterances to text, speech transcription performance indications may be provided to the receiving user in accordance with the disclosure of SUP A 121197,213 and any corresponding U.S. application publication thereof, both of which are incorporated herein by reference. Additionally, in the context of SMS messaging, the ASR system preferably makes use of both statistical language models (SLMs) for returning results from the audio data, and finite grammars used to post-process the text results, in accordance with USPA 121198,112 and any corresponding U.S. application publication, both of which are incorporated herein by reference. The use of such technology is believed to result in text messages that are formatted in a way that looks more typical of how a human would have manually entered the text message using a mobile communication device.

In operation, one or more transceiver towers 130A receive from the mobile phone 12 a message that includes audio data representing a recorded utterance (A). The message (A) is transmitted from the towers 130A to a mobile communication service provider 140 and then over the Internet 150 to the ATFS 18 and, specifically, to a backend server 160 that performs the transcription of the recorded utterance. The transcription may be filtered in accordance with the disclosure of U.S. Patent Appl. Pub. No. US 2007/0239837 and U.S. patent application Ser. No. 12/198,112, so as to include abbreviations and other jargon typically used in text messaging. Once transcribed and filtered, a message that includes the recorded utterance, now converted to text (T), is sent back to the mobile phone 12. In particular, the message (T) is sent over the Internet 150, to the mobile communication service provider 140, over the towers 130A, and to the mobile device 12.

Once received by the mobile phone 12, the transcribed and filtered text is reviewable by Adam for proofing and correction. Once verified, the text is sent in a text message (M) to Betty by sending the message (T) over the towers 130A, to the mobile communication service provider 140, then over the towers 130B and, ultimately, to the mobile phone 14. Furthermore, it should be noted that in this and the following examples, it is assumed that Adam and Betty utilize the same mobile communication service provider 140; in the alternative, it will be appreciated that a second mobile communication service provider could be inserted in this path after the first mobile phone service provider.

Figure 5:
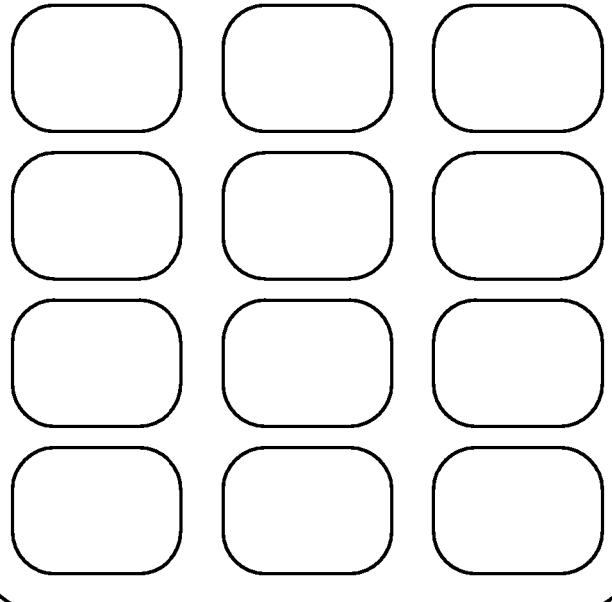
FIG. 5 is a graphical illustration of the chronological sequence of communications of FIG. 4 as it might appear on a display of an instant messaging (IM) client on one mobile phones of the users.

The messages may be displayed individually or as part of a conversation. FIG. 4 is a transcription of a chronological sequence of communications, between the two users 12,14, that transpires using the mobile phones 12,14 and the portion of the communication system 10 shown in FIG. 3, and FIG. 5 is a graphical illustration of this chronological sequence of communications of FIG. 4 as it might appear on a display of an instant messaging (IM) client on one of the users' mobile phones 12,14. A threaded text messaging display would be similar in appearance.

In accordance with certain preferred embodiments of the present invention, certain words are highlighted in the display when the text of communications are displayed in order to draw attention to those words relative to other displayed words. The words that are highlighted represent words for which additional content may be selected for presentation to a user, such as by display or otherwise, the additional content being an advertisement that relates in some manner to the highlighted word. Moreover, the advertising presented may be audio (and thus played); visual (and thus displayed); or audio-visual (and thus the audio portion played and the visual portion displayed).

Thus, for example, as shown in the graphical illustration of FIG. 4, the words "sushi" and "movies" are "highlighted" by being shown underlined and in bold on the phone's display. As used herein with reference to preferred embodiments, "word" (sometimes "keyword") generally means a single word, part of a word, or a phrase, i.e., a collection of words, and may be an alphanumeric string, including alphanumeric strings commonly used in text messaging and instant messaging (sometimes "text speak"). Moreover, as used herein with reference to preferred embodiments, "highlighted" (sometimes "activated") generally means a word having an attribute that is different from most other words with which it is displayed for purposes of drawing a person's attention to that word when displayed with the other words. Highlighting is setting the attribute of such word so that it is highlighted when displayed. Of course, other forms of highlighting, including varying font size and/or color, background highlighting, animated effects (e.g., blinking) or the like may likewise be utilized singularly or in combination.

In further accordance with preferred embodiments of the invention, and as further described in greater detail herein below, the highlighted words are words for which advertising has been identified for presentation to the user, such as by display or otherwise, and highlighted words may be selected by a user, with the selection of a highlighted word resulting in the display of the respective advertising for the highlighted word.

For example, FIG. 6 illustrates Betty speaking "sushi" into her mobile phone 14 for purposes of selecting the highlighted word "sushi." In response, a pop-up, browser window or the like opens on the display of the mobile phone 14. FIG. 7 is a graphical illustration of an exemplary pop-up, displayed in response to Betty's utterance, that advertises "Suzy's Sushi Shack" restaurant. In the illustration, the advertisement includes the address, operating hours, and phone number, but any information or other additional content data may alternatively or additionally be provided. In a further feature, the information may be tailored based, in part, on the location of Betty's mobile phone 14, whereby the location of the information (such as a particular nearby restaurant serving sushi) will be close in proximity to Betty's location. This may be facilitated when Betty's phone includes GPS capabilities, and Betty's location is communicated by her mobile phone, either with an utterance or otherwise.

The highlighting and providing of the advertising for display can be accomplished through various implementations of preferred embodiments of the invention. Accordingly, different implementations are now described, in any of which the foregoing exemplary scenario is enabled.

In each case, one or more system elements are equipped to carry out one or more functions pertaining to the process of identifying words in the text message for which advertising is available for delivery to a client device and/or of determining the circumstances under which the advertising is actually communicated to a client device. Sub-functions that may be utilized include, but are not limited to: scanning a message and identifying words for which advertising is available for delivery to a client device; activating/highlighting identified words; determining the sources from which advertising is obtained; and using additional data, in combination or association with the words themselves, to more precisely control the advertising/additional content data to be associated with each activated/highlighted word. Furthermore, user preferences, some of which are described herein, may be incorporated into one or more of these functions. Further details of these various functions are provided below.

For each message, there may be one or more words for which advertising is available for delivery to a client device. Although it is possible for every word in the message to be considered, it may be preferable for one or more of the words to be removed from consideration, thereby improving performance. These words may be identified in one or more ways. For example, certain very common words, including prepositions and articles (except perhaps if included within a longer phrase), are preferably removed from consideration as being too common for any meaningful advertising to be associated therewith. Other more sophisticated techniques may likewise be applied to reduce the words under consideration.

In a simple example, only words considered may be terms which are capitalized. Still further, combinations of words (phrases) may be considered, or only single words may be considered, and in each case, text speak mayor may not be considered. In at least one embodiment, these various possibilities are established only by the system owner or implementer and may not be varied by the user. In at least one other embodiment, however, one or more of these parameters are user preferences that pertain only to a specific user and that may be set and adjusted by that user. For example, each user could control, via preference settings, whether capitalized terms or all terms are considered for available advertising, or whether single words, phrases of a certain length, or text speak are considered. User preferences may be established directly via the client application in the device 12,14, indirectly via a web application, or both.

Figure 8A:
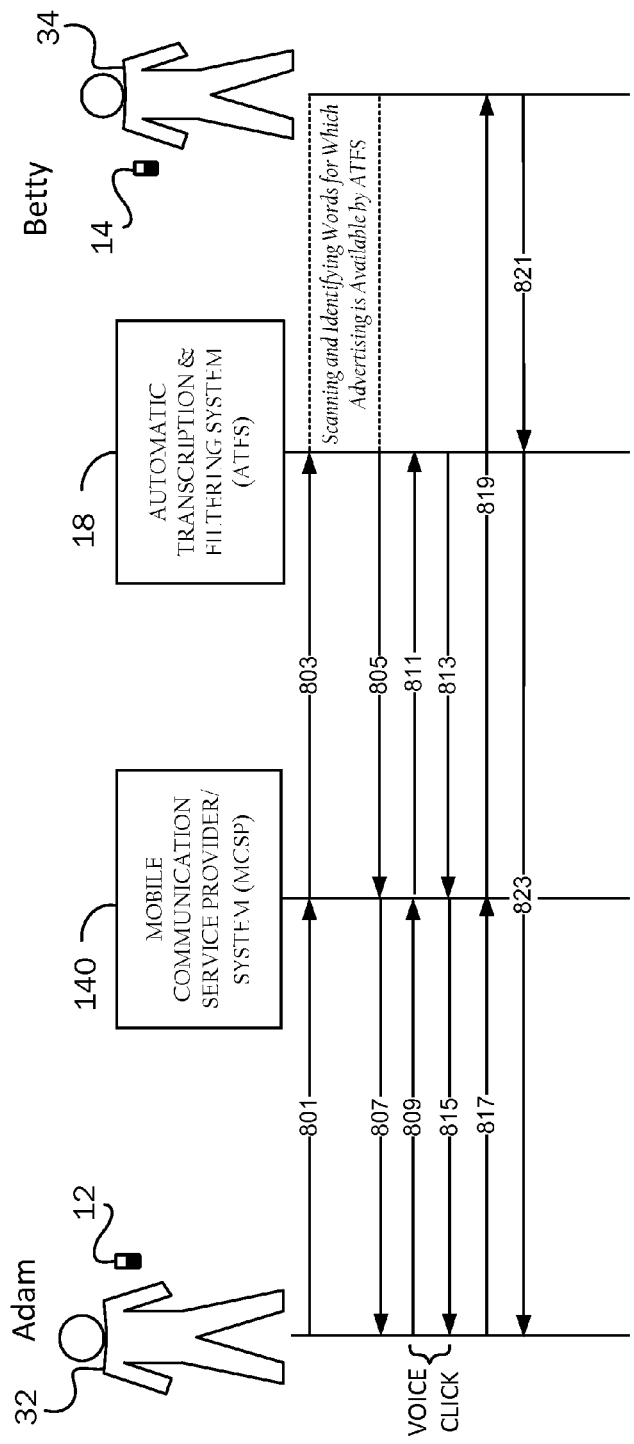
FIG. 8A is a graphical illustration showing the sequence of messages in a preferred implementation of the invention, wherein scanning and identifying words for which advertising is available for delivery to a client device are performed by the automatic transcription and filtering ("ATFS") system 18 III the portion of the communication system of FIG. 3.
Figure 8B:
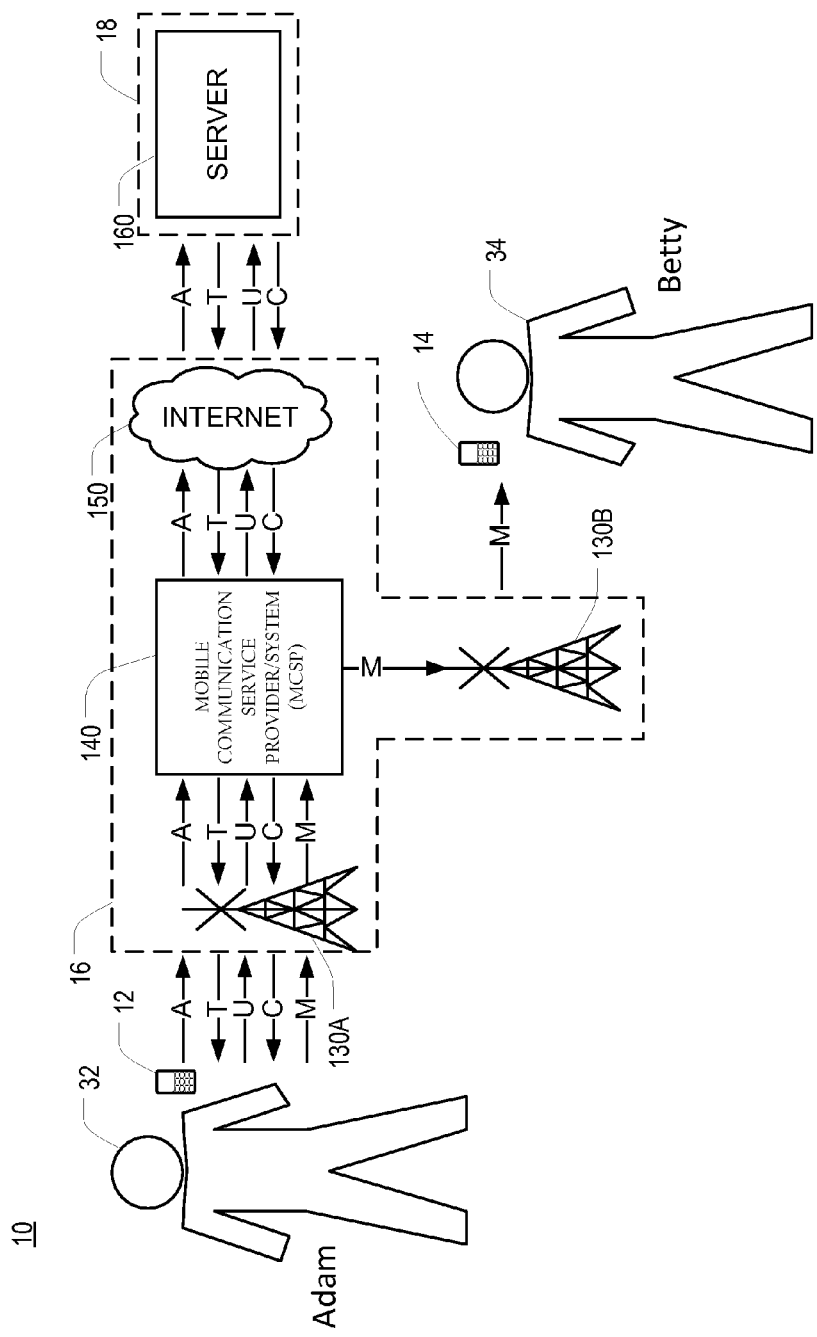
FIG. 8B is a diagram of the portion of the communication system of FIG. 3 over which the sequence of messages are communicated in FIG. 8A.
Figure 9:
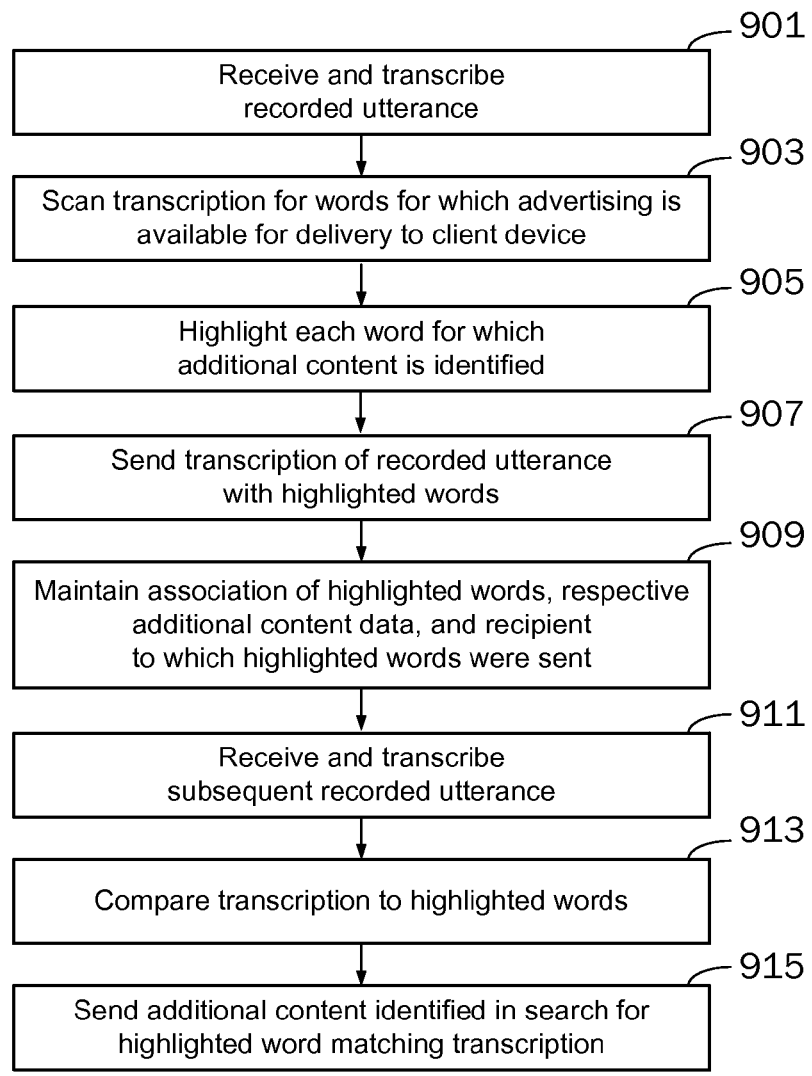
FIG. 9 is a flowchart of steps in a method performed by the ATFS 18 III accordance with the preferred implementation of FIG. 8A.

In accordance with a first preferred embodiment, the two users 12,14 (generally referred to hereinafter only as "Adam" and "Betty" for convenience) communicate using text messaging with their mobile phones 12,14. Furthermore, Adam uses the ATFS 18 so that he may text Betty without typing in the text of his text messages. Such an embodiment is next discussed with reference to FIGS. 8A, 8B, and 9, wherein FIG. 8A is a graphical illustration showing the sequence of messages in a preferred implementation of the invention, wherein scanning and identifying words for which advertising is available for delivery to a client device are performed by the ATFS 18 in the portion of the communication system 10 of FIG. 3; FIG. 8B is a diagram of the portion of the communication system of FIG. 3 over which the sequence of messages are communicated in FIG. 8A; and FIG. 9 is a flowchart of steps in a method performed by the ATFS 18 in accordance with the preferred implementation of FIG. 8A.

As shown therein, Adam utters a message to be sent to Betty. The utterance is recorded in the form of audio data (A) and is communicated 801 over networks 16 in system 10 to a mobile communication service provider 140 and then communicated 803 via the Internet 150 to the ATFS 18, which is implemented by one or more servers 160 (collectively and singly referred to herein as a "server"). In accordance with this implementation, the ATFS 18 receives and transcribes 901 the recorded utterance from Adam and scans 903 the transcription and identifies words for which advertising is available for delivery to a client device. Those words for which advertising is available for delivery to a client device then are highlighted. The identification of words for which advertising is available for delivery to a client device is performed according to one or more of the techniques described herein (e.g., only words that are capitalized may be considered; words like "the" and "a" mayor may not be considered; phrases mayor may not be considered; and user preferences mayor may not be considered, etc.).

The identified words for which advertising is determined to be available are highlighted 905 by the ATFS 18, and the transcribed and filtered text (T)-including the highlighted words-are communicated 805 to the mobile communication service provider 140 and then communicated 807 to Adam's mobile phone 12. Additionally, the ATFS 18 maintains 909 an association of the highlighted words, additional content data for the respective advertising for each of the respective identified words, and an identifier of the recipient (e.g., Adam's phone 12) to which the highlighted words were sent 907.

Thereafter, when a subsequent recorded utterance (U) from Adam's phone 12 is communicated 809,811 and received and transcribed to text 911, the transcription is compared 913 to the highlighted words that are maintained in association with the identifier for Adam's phone 12. Upon a match, it is determined that one of the highlighted words has been selected by Adam for display of the advertising on Adam's phone. Consequently, the additional content data (C) maintained in association with the highlighted word of the match is sent 915 to Adam's mobile phone 12 for display of the advertising on Adam's mobile phone 12. The additional content data (C) may comprise the advertising itself for display or, preferably, the additional content data comprises an Internet web address whereat the advertising is found for presentation on Adam's mobile phone 12. The additional content data is communicated 813,815 to Adam's mobile phone 12, whereby, upon receipt, the mobile phone 12 is caused to present the advertising to the user. In this regard, it will be appreciated that if the additional content data includes a web address (e.g., www.suzysushi.com). such address may be passed to the mobile web browser application of the mobile phone 12 for display of the web page via a mobile web browser of the mobile phone 12. As shown in the message sequence of FIG. 8A, Adam then sends 817,819 a text message to Betty, and Betty may respond 821,823 with a text message of her own.

As used herein with reference to preferred embodiments, "additional content data" generally means a pointer, such as a URL, whereat advertising is available for display, but also may mean the advertising itself. Furthermore, as used herein with reference to preferred embodiments, "voice click" is intended to mean the selection of a highlighted word by voice for the intended display of advertising associated with the selected word. Furthermore, it will be appreciated from FIG. 8A that Adam utilizes the "voice click" feature of the invention in this illustration and that Betty does not utilize the "voice click" feature in this illustration.

Figure 10:
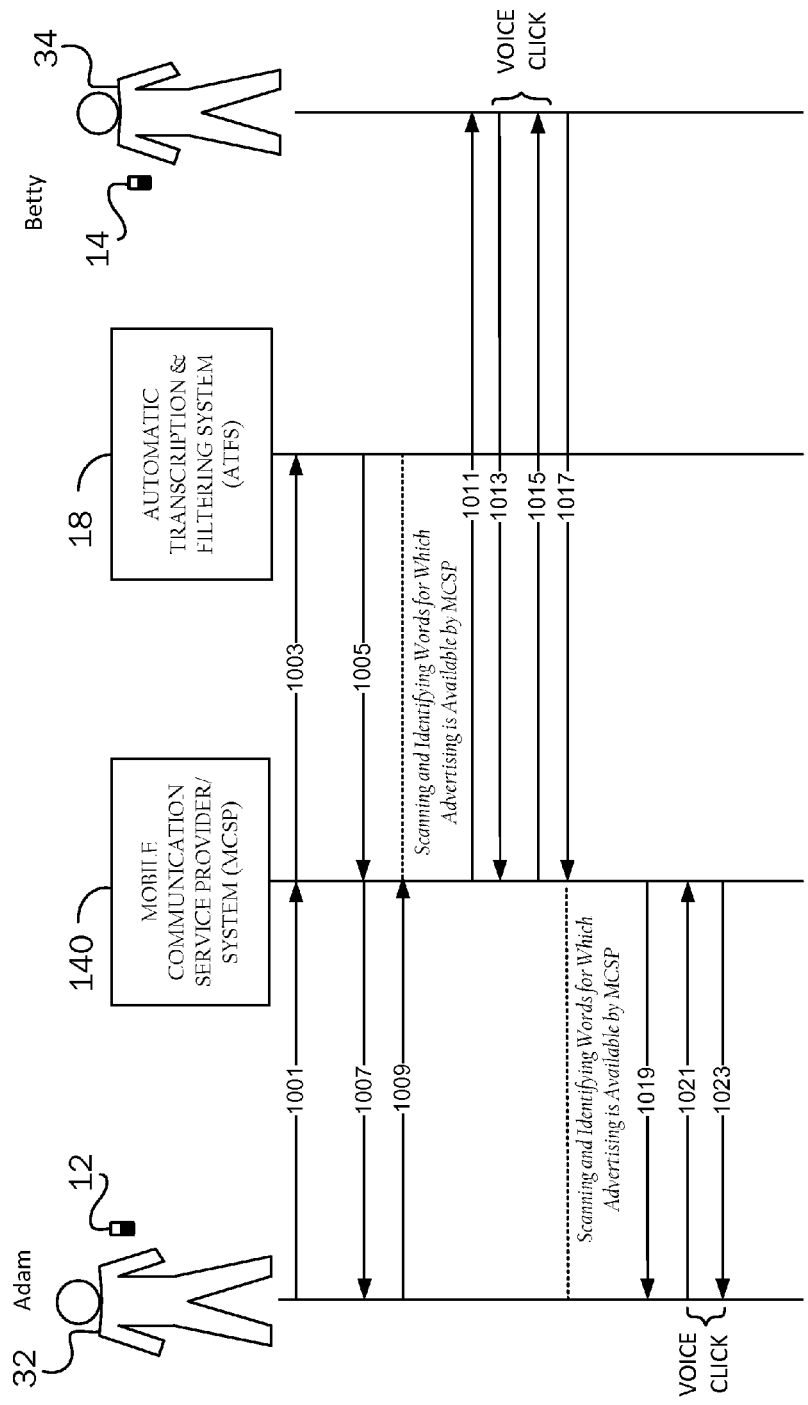
FIG. 10 is a graphical illustration showing the sequence of text messages III another preferred implementation of the invention, wherein scanning and identifying words for which advertising is available for delivery to a client device are performed by the mobile communication service provider in the portion of the communication system of FIG. 3.
Figure 11:
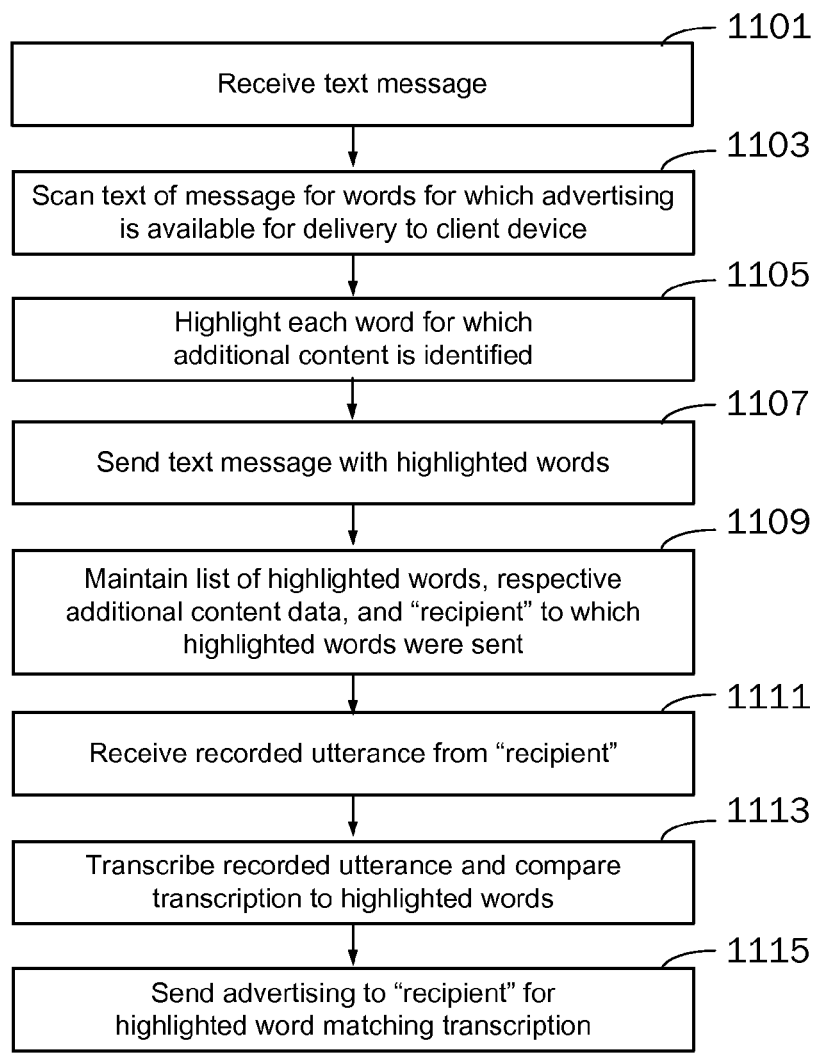
FIG. 11 is a flowchart of steps in a method performed by the mobile communication service provider in accordance with the preferred implementation of FIG. 10.

Another implementation in accordance with a preferred embodiment of the invention is described with reference now to FIGS. 10-11, wherein FIG. 10 is a graphical illustration showing the sequence of text messages in such preferred implementation of the invention, and wherein scanning and identifying words for which advertising is available are performed by the mobile communication service provider 140 in the portion of the communication system 10 of FIG. 3; and FIG. 11 is a flowchart of steps in a method performed by the mobile communication service provider 140 in accordance with the preferred implementation of FIG. 10. Similar to the communication of FIGS. 8A, 8B and 9, Adam and Betty communicate using text messaging with their mobile phones 12,14. Furthermore, Adam uses the ATFS 18 so that he may text Betty without typing in the text of his text messages.

Specifically, as illustrated, Adam first utters a message to be sent to Betty. The utterance is recorded in the form of audio data and is communicated 1001 to mobile communication service provider 140 and then communicated 1003 to the ATFS 18. The utterance is transcribed to text by the ATFS 18 and then communicated 1005,1007 back to Adam's phone 12.

This part of the sequence is in accordance with the disclosure of D.S. Patent Appl. Publ. No. 2007/0239837.

Adam next sends 1009 the transcribed text in a text message. In accordance with this implementation, the mobile communication service provider 140 receives 1101 and scans 1103 the text message for words for which advertising is available for deliver to a client device. For each word identified found in the scanning 1103, the mobile communication service provider highlights 1105 the identified word. The text message, including the highlighted words, are then communicated 1011 to Betty's mobile phone 14. Additionally, the mobile communication service provider 140 maintains 1109 an association of the highlighted words, additional content data for the respective advertising of the respective words identified in the scanning, and an identifier of the recipient (e.g., Betty's phone 14) to which the highlighted words were sent 1107.

Thereafter, a subsequent recorded utterance from Betty's phone 14 may be communicated 1013 and received 1111 and transcribed 1113 to text by the mobile communication service provider 140, whereupon the transcription is compared 1113 to the highlighted words that are maintained in association with the identifier for Betty's phone 14. Upon a match, it is determined that one of the highlighted words has been selected by Betty for display of the corresponding advertising on Betty's phone 14. Consequently, the additional content data maintained in association with the highlighted word of the match is sent 1115 to Betty's mobile phone 14 for display of the advertising on Betty's mobile phone 14.

The additional content data (C) may comprise the advertising for display or, preferably, the additional content data comprises an Internet web address. The additional content data is communicated to Betty's mobile phone 14, whereby, upon receipt, the mobile phone 14 is caused to present the advertising to the user. In this regard, it will be appreciated that if the additional content data includes a web address (e.g., www.suzysushi.com). such address may be passed to a mobile web browser application of the mobile phone 14 for display of the advertising found at the web address.

It will be appreciated that in this implementation, the mobile communication service provider 140 may utilize the same technology as the ATFS 18 (i.e., the mobile communication service provider 140 may itself include an ASR engine and other components found in the ATFS 18) in receiving, transcribing, and comparing an utterance to highlighted words taken from messages for which words advertising has been identified. Moreover, the ability of the mobile communication service provider 140 to do this enables highlighting of words in text messages from Betty to Adam even when Betty manually types the text messages on her mobile phone 14.

For example, as shown in the message sequence of FIG. 10, Betty sends 1017 a text message to Adam. The mobile communication service provider 140 receives and scans the text message from Betty and identifies words for which advertising is available. The text message-including the highlighted keywords-is then communicated 1019 to Adam's mobile phone 12. Additionally, the mobile communication service provider 140 maintains an association (preferably in a database) of the highlighted words, additional content data for the respective advertising available for the identified words, and an identifier of Adam's phone 12 to which the highlighted words were communicated 1019.

Thereafter, a subsequent recorded utterance from Adam's phone 12 may be communicated 1021 and received and transcribed to text by the mobile communication service provider 140, whereupon the transcription is compared to the highlighted words that are maintained in association with the identifier for Adam's phone 12. Upon a match, it is determined that one of the highlighted words has been selected by Adam for display of the advertising on Adam's phone 12. Consequently, the additional content data maintained in association with the highlighted word of the match is sent 1023 to Adam's mobile phone 12 for display of the advertising on Adam's mobile phone 12.

Figure 12:
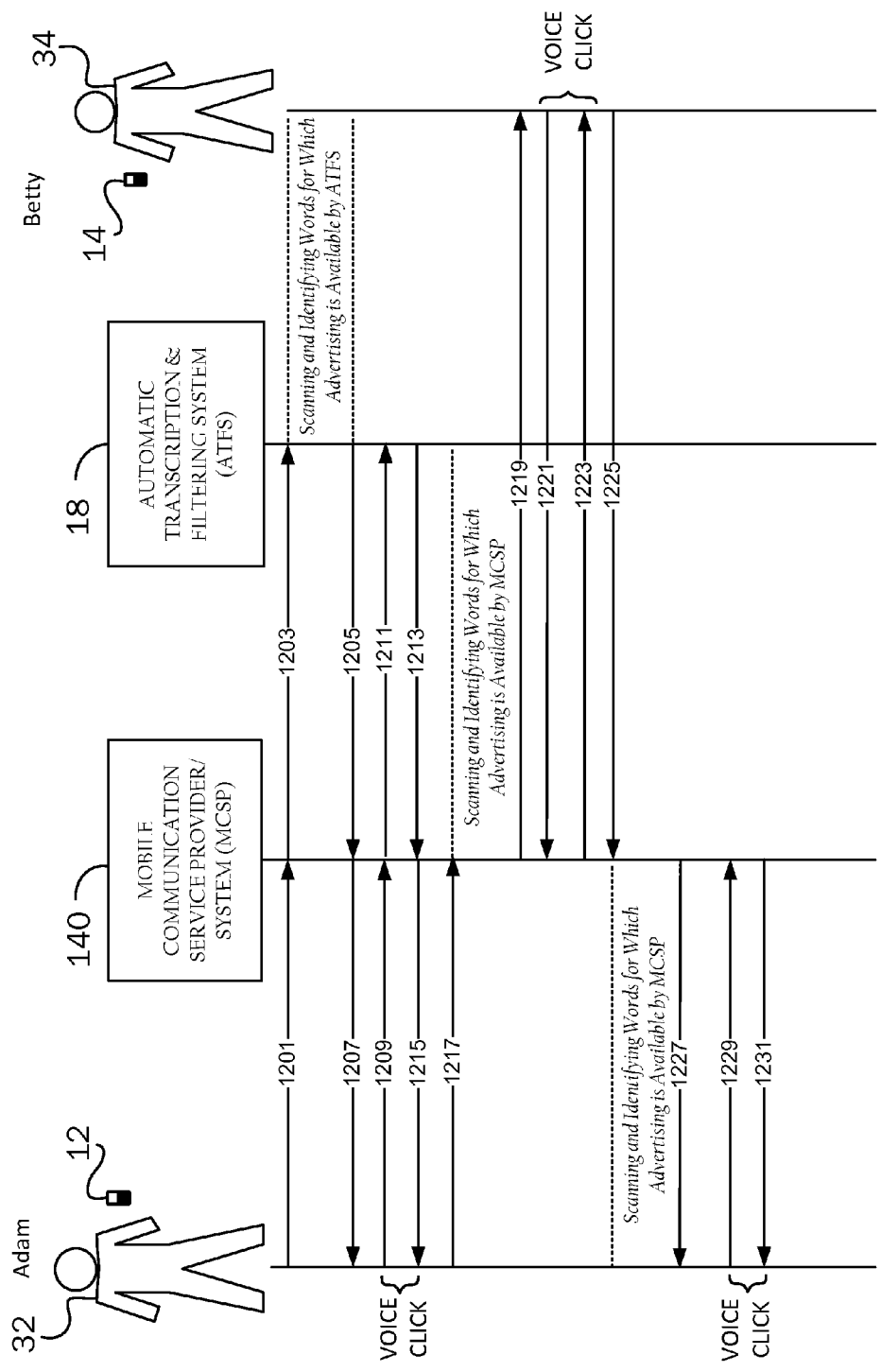
FIG. 12 is a graphical illustration showing the sequence of text messages in yet another preferred implementation of the invention, wherein scanning and identifying words for which advertising is available for delivery to a client device are performed by both the ATFS 18 and the mobile communication service provider in the portion of the communication system of FIG. 3.

A third implementation in which text messaging between Adam and Betty is illustrated is shown in FIG. 12, which simply represents the combination of the first and second implementations, i.e., in this third implementation, both the ATFS 18 and the mobile communication service provider 140 separately and independently support voice clicking. More particularly, FIG. 12 is a graphical illustration showing the sequence of text messages in such an implementation of the invention, wherein scanning and identifying words for which advertising is available are performed by both the ATFS 18 and the mobile communication service provider 140 in the portion of the communication system 10 of FIG. 3.

Specifically, Adam utters a message to be sent to Betty. The utterance is recorded in the form of audio data and is communicated 1201 to mobile communication service provider 140 and then communicated 1203 to the ATFS 18. In accordance with this implementation, the ATFS 18 receives and transcribes the recorded utterance from Adam and scans the transcription for words that are appropriate for highlighting.

The ATFS 18 highlights each word identified for which advertising is available, and the transcribed and filtered text-including the highlighted keywords-are communicated 1205 to the mobile communication service provider 140 and then communicated 1207 to Adam's mobile phone 12. Additionally, the ATFS 18 maintains an association (preferably in a database) of the highlighted words, additional content data for the respective advertising that is available for delivery to Adam's phone 12, and an identifier of Adam's phone 12.

Thereafter, when a subsequent recorded utterance from Adam's phone 12 is communicated 1209,1211 and received by the ATFS 18 and transcribed to text, the transcription is compared to the highlighted words that are maintained in association with the identifier for Adam's phone 12. Upon a match, it is determined that one of the highlighted words has been selected by Adam for display of the corresponding advertising on Adam's phone. Consequently, the additional content data maintained in association with the highlighted word of the match is communicated 1213,1215 to Adam's mobile phone 12 for display of the advertising on Adam's mobile phone 12. The additional content data (C) may itself comprise the advertising for display or, preferably, the additional content data comprises an Internet web address. The additional content data is communicated to Adam's mobile phone 12, whereby, upon receipt, the mobile phone 12 is caused to present the advertising to Adam. In this regard, it will be appreciated that if the additional content data includes a web address (e.g., www.suzysushi.com). such address may be passed to the mobile web browser application of the mobile phone 12 for display of the advertising via the web browser.

As shown in the message sequence of FIG. 12, Adam then sends 1217 a text message to Betty that includes the transcribed and filtered text received from the ATFS 18, but that does not include the highlighted words. In accordance with this implementation, the mobile communication service provider 140 receives and scans the text message and identifies words for which advertising is available. For each identified word found in the scanning, the mobile communication service provider 140 highlights the identified word. The text message including the highlighted keywords-are then communicated 1219 to Betty's mobile phone 14. Additionally, the mobile communication service provider 140 maintains an association of the highlighted words, additional content data for the advertising for each of the respective words identified in the scanning, and an identifier of the recipient (e.g., Betty's phone 14) to which the highlighted words were sent.

Thereafter, a subsequent recorded utterance from Betty's phone 14 may be communicated 1221 to, and received and transcribed to text by, the mobile communication service provider 140, whereupon the transcription is compared to the highlighted words that are maintained in association with the identifier for Betty's phone 14. Upon a match, it is determined that one of the highlighted words has been selected by Betty for display of the advertising on Betty's phone 14. Consequently, the additional content data maintained in association with the highlighted word of the match is sent to Betty's mobile phone 14 for display of the corresponding advertising on Betty's mobile phone 14. The additional content data (C) may itself comprise the advertising for display or, preferably, the additional content data comprises an Internet web address or other pointer for acquisition of the advertising by Betty's mobile phone 14. The additional content data is communicated 1223 to Betty's mobile phone 14, whereby, upon receipt, the mobile phone 14 is caused to present the advertising to the user. In this regard, it will be appreciated that if the additional content data includes a web address (e.g., www.suzysushi.com). such address may be passed to the mobile web browser application of the mobile phone 14 for display of the advertising via the web browser.

It will be appreciated that in this implementation, the mobile communication service provider 140 may utilize the same technology as the ATFS 18 in receiving, transcribing, and comparing an utterance to highlighted words. Moreover, the ability of the mobile communication service provider 140 to do this enables highlighting of words in text messages from Betty to Adam even when Betty manually types the text messages on her mobile phone 14.

For example, as shown in the message sequence of FIG. 10, Betty sends 1225 a text message to Adam. The mobile communication service provider 140 receives and scans the text message from Betty and identifies words for which advertising is available, and the mobile communication service provider 140 highlights each identified word. The text message including the highlighted keywords-are then communicated 1227 to Adam's mobile phone 12. Additionally, the mobile communication service provider 140 maintains an association (preferably in a database) of the highlighted words, additional content data for the respective advertising for each of the respective identified words, and an identifier of Adam's phone 12 to which the highlighted words were communicated 1227.

Thereafter, a subsequent recorded utterance from Adam's phone 12 may be communicated 1229 and received and transcribed to text by the mobile communication service provider 140, whereupon the transcription is compared to the highlighted words that are maintained in association with the identifier for Adam's phone 12. Upon a match, it is determined that one of the highlighted words has been selected by Adam for display of the advertising on Adam's phone 12. Consequently, the additional content data maintained in association with the highlighted word of the match is sent 1231 to Adam's mobile phone 12 for display of the advertising on Adam's mobile phone 12.

Fourth, fifth, and sixth implementations are illustrated, respectively, with reference to FIGS. 13-14, FIGS. 15-16, and FIG. 17. The similarities with the first, second, and third implementations of FIGS. 8-9, 10-11, and 12, respectively, will be appreciated. However, in the fourth, fifth, and sixth implementations, communications between Adam and Betty are effected by instant messaging (IM) using an 1M client on each mobile phone 12,14 in communication with a server of an 1M service provider 240.

Figure 13:
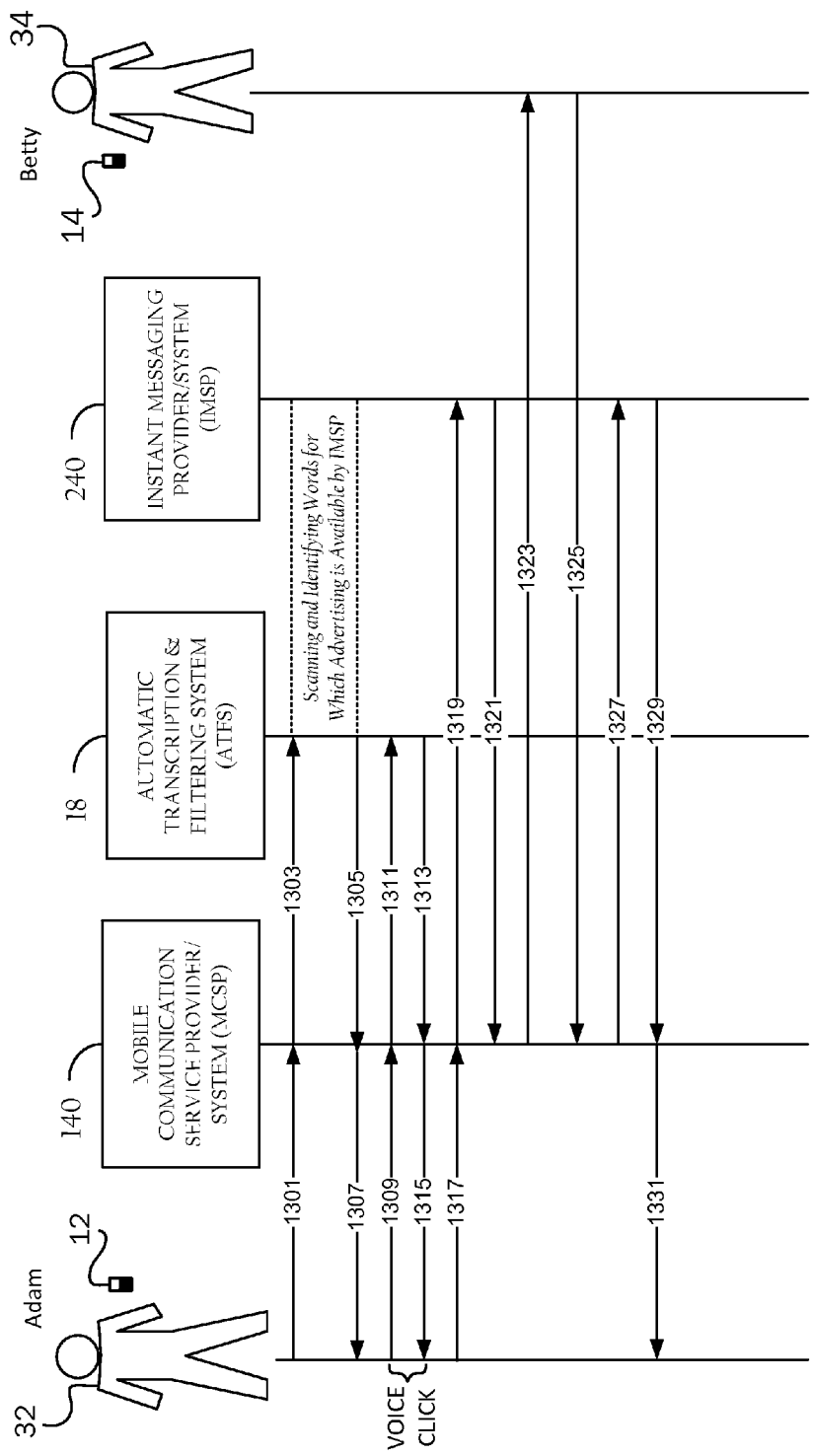
FIG. 13 is a graphical illustration showing the sequence of messages in a preferred implementation of the invention, wherein scanning and identifying words for which advertising is available for delivery to a client device are performed by the ATFS 18 in the portion of the communication system of FIG. 3.

More specifically, in the fourth implementation, the ATFS 18 supports voice clicking, as in the first implementation. FIG. 13 is a graphical illustration showing the sequence of messages in such an implementation of the invention, wherein scanning and identifying words for which advertising is available for delivery are performed by the ATFS 18 in the portion of the communication system 10 of FIG. 3; and FIG. 14 is a flowchart of steps in a method performed by the ATFS 18 in accordance with the preferred implementation of FIG. 13.

Figure 14:
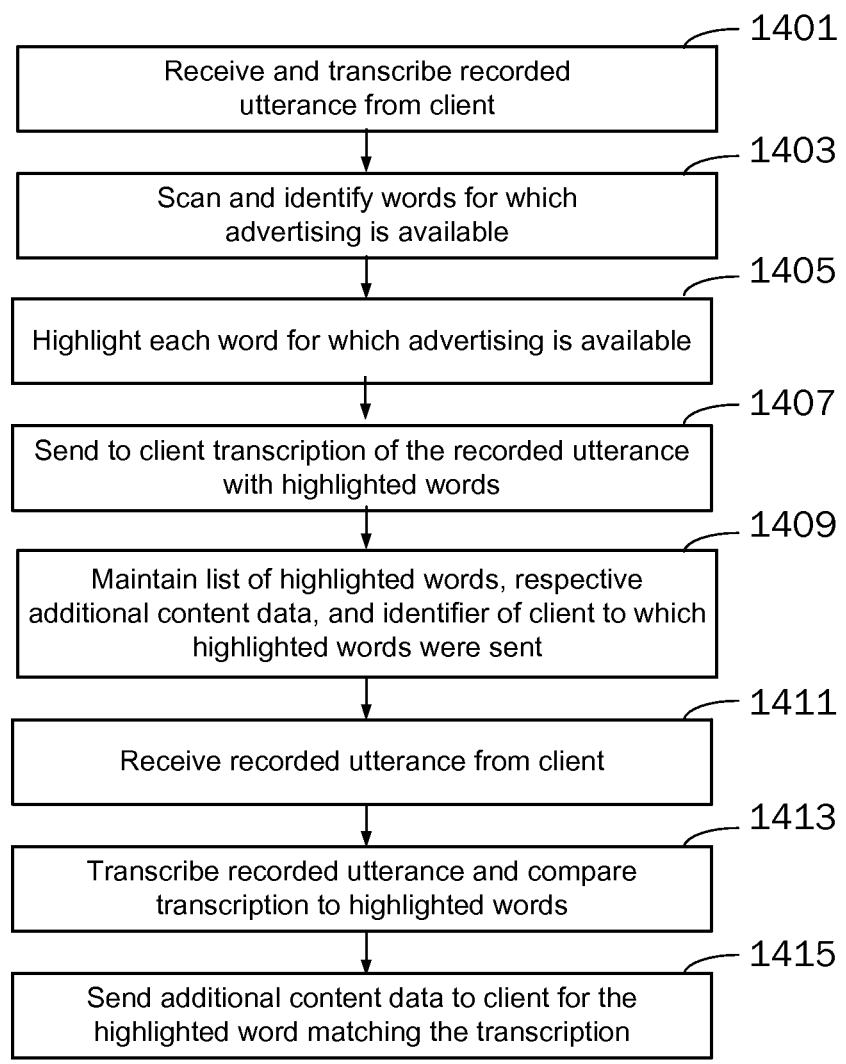
FIG. 14 is a flowchart of steps in a method performed by the ATFS in accordance with the preferred implementation of FIG. 13.

As shown in FIGS. 13 and 14, Adam utters a message to be transcribed and sent to Betty. The utterance is recorded in the form of audio data and is communicated 1301 to mobile communication service provider 140 and then communicated 1303 to the ATFS 18. In accordance with this implementation, the ATFS 18 receives and transcribes 1401 the recorded utterance from Adam and scans 1403 the transcription and identifies words thereof for which advertising is available. The ATFS 18 highlights 1405 each identified word, and the transcribed and filtered text-including the highlighted words-are communicated 1305 to the mobile communication service provider 140 and then communicated 1307 to Adam's mobile phone 12. Additionally, the ATFS 18 maintains 1409 an association of the highlighted words, additional content data for each respective identified words, and an identifier of the recipient (e.g., Adam's phone 12) to which the highlighted words were sent 1407.

Thereafter, when a subsequent recorded utterance from Adam's phone 12 is communicated 1309,1311 and received 1411 by the ATFS 18, it is then transcribed to text and compared 1413 to the highlighted words that are maintained in association with the identifier for Adam's phone 12. Upon a match, it is determined that one of the highlighted words has been selected by Adam for display of the corresponding advertising on Adam's phone. Consequently, the additional content data maintained in association with the highlighted word of the match is sent 1415 to Adam's mobile phone 12 for display of the advertising on Adam's mobile phone 12. The additional content data (C) may itself comprise the advertising for display or, preferably, the additional content data comprises an Internet web address. The additional content data is communicated 1313,1315 to Adam's mobile phone 12, whereby, upon receipt, the mobile phone 12 is caused to present the advertising to the user. In this regard, it will be appreciated that if the additional content data includes a web address (e.g., www.suzysushi.com). such address may be passed to the mobile web browser application of the mobile phone 12 for display of the advertising via the web browser.

As shown in the message sequence of FIG. 13, Adam next sends an instant message intended for Betty, which is communicated 1317,1319 to the 1M service provider 240. The instant message from Adam to Betty includes the transcribed and filtered text received from the ATFS 18, but does not include the highlighted words from the ATFS 18. The instant message is communicated 1321 to the mobile communication service provider 140, and then communicated 1323 to Betty's mobile phone 14. In response, Betty sends an instant message intended for Adam, which is communicated 1325,1327 to the 1M service provider 240. The instant message is communicated 1329 to the mobile communication service provider 140 and then communicated 1323 to Adam's mobile phone 12.

Figure 15:
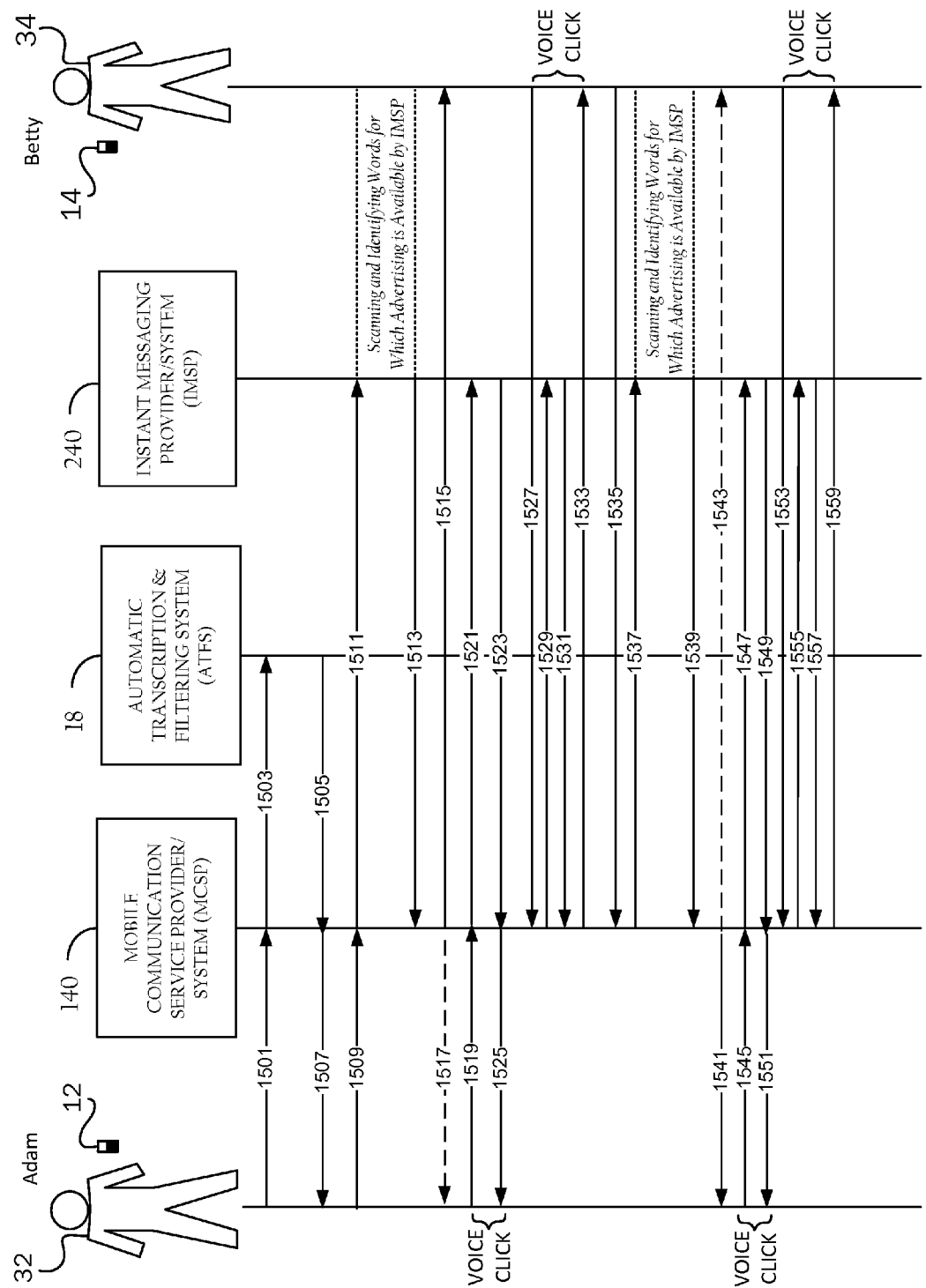
FIG. 15 is a graphical illustration showing the sequence of text messages in another preferred implementation of the invention, wherein scanning and identifying words for which advertising is available for delivery to a client device are performed by the 1M service provider in the portion of the communication system of FIG. 3.

In the fifth implementation, like the second implementation, the ATFS 18 does not support voice clicking, which instead is supported by the IM service provider 240. FIG. 15 is a graphical illustration showing the sequence of text messages in such a preferred implementation of the invention, wherein scanning and identifying words for which advertising is available are performed by the 1M service provider 240 in the portion of the communication system 10 of FIG. 3; and FIG. 16 is a flowchart of steps in a method performed by the 1M service provider 240 in accordance with the preferred implementation of FIG. 15.

Figure 16:
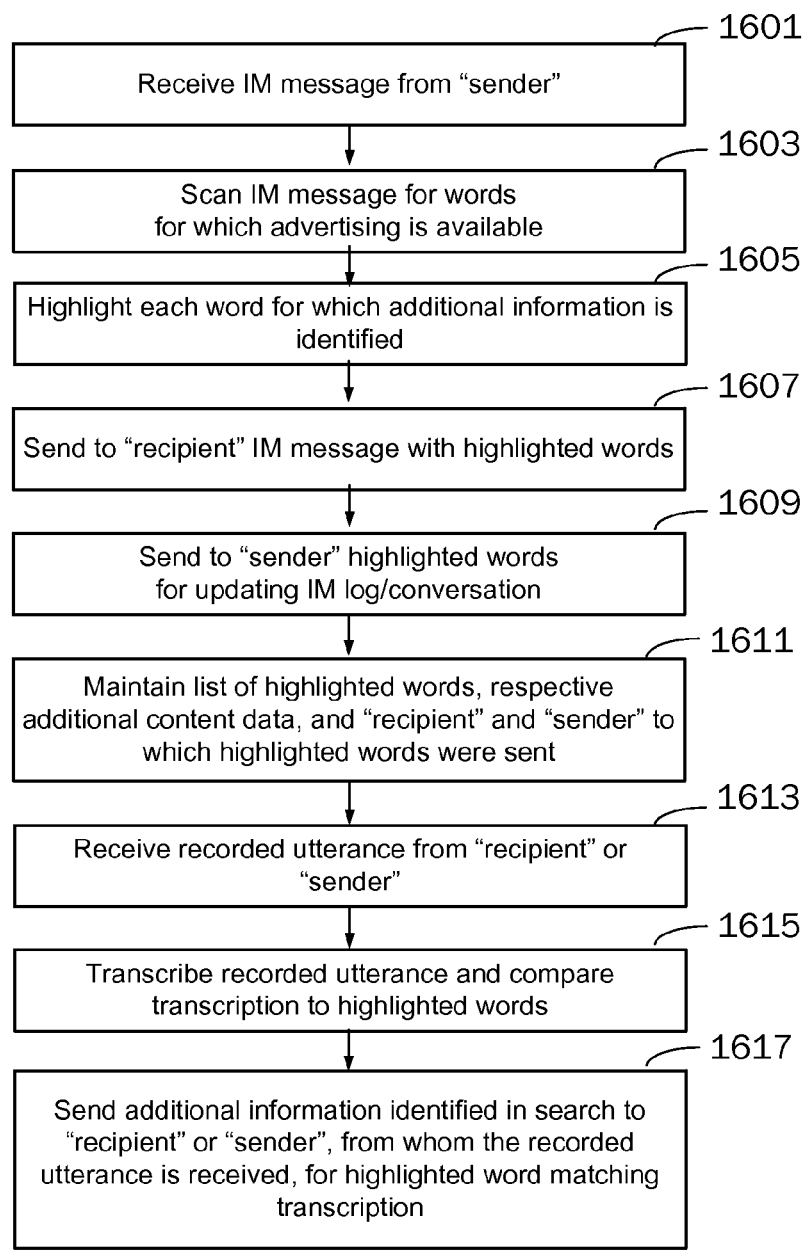
FIG. 16 is a flowchart of steps in a method performed by the 1M service provider in accordance with the preferred implementation of FIG. 15.

Specifically, as illustrated in FIGS. 15 and 16, Adam first utters a message to be sent to Betty. The utterance is recorded in the form of audio data and is communicated 1501 to mobile communication service provider 140 and then communicated 1503 to the ATFS 18. The utterance is transcribed to text by the ATFS 18 and then communicated 1505,1507 back to Adam's phone 12. This part of the sequence is in accordance with the disclosure of US Patent Application Publication No. 2007/0239837.

Adam next sends 1509 the transcribed text in an instant message. In accordance with this implementation, the mobile communication service provider 140 communicates 1511 the instant message to the 1M service provider 240. The 1M service provider 240 receives 1601 and scans 1603 the instant message and identifies 1603 words for which advertising is available, and the 1M service provider 140 highlights the identified words. Preferably, the instant message-including the highlighted keywords-are then communicated 1513 to the mobile communication service provider 140 and, thereafter, are communicated 1515 to the recipient 1609. Additionally, the highlighted keywords also are communicated 1517 to the sender of the instant message for updating of the log/1M conversation of the sent message with the highlighted words for possible selection thereof by the sender of the instant message, and identifiers of both mobile phones 12,14 preferably are maintained 1611 in association with the highlighted keywords and respective additional content data. Alternatively, the 1M service provider 240 communicates the highlighted keywords only to the recipient, and only an identifier of the recipient's mobile phone is maintained in the association.

Thereafter, a subsequent recorded utterance from Adam's phone 12 may be communicated 1519,1521 and received 1613 and transcribed 1615 to text by the 1M service provider 240, whereupon the transcription is compared 1615 to the highlighted words that are maintained in association with the identifier for Adam's phone 12. Upon a match, it is determined that one of the highlighted words has been selected for display of the advertising. Consequently, the additional content data maintained in association with the highlighted word of the match is sent 1617 to Adam's phone 12 for display of the advertising. The additional content data is communicated 1523 to the mobile communication service provider 140 and then is communicated 1525 to Adam's phone 12.

In addition, a subsequent recorded utterance from Betty's phone 14 may be communicated 1527,1529 and received 1613 and transcribed 1615 to text by the 1M service provider 240, whereupon the transcription is compared 1615 to the highlighted words that are maintained in association with the identifier for Betty's phone 14. Upon a match, it is determined that one of the highlighted words has been selected for display of the advertising. Consequently, the additional content data maintained in association with the highlighted word of the match is sent 1617 to Betty's phone 14 for display of the advertising. The additional content data is communicated 1531 to the mobile communication service provider 140 and then is communicated 1533 to Betty's phone 14.

In each case, the additional content data (C) may itself comprise the advertising for display or, preferably, the additional content data comprises an Internet web address. The additional content data is communicated to the respective mobile phone 12,14, whereby, upon receipt, the mobile phone 12,14 is caused to present the advertising to the user. In this regard, it will be appreciated that if the additional content data includes a web address (e.g., www.suzysushi.com). such address may be passed to the mobile web browser application of the mobile phone 12 for display of the advertising via the web browser.

It will be appreciated that in this implementation, the 1M service provider 240 may utilize the same technology as the ATFS 18 in receiving, transcribing, and comparing an utterance to highlighted words. Moreover, the ability of the 1M service provider 240 to do this enables highlighting of words in instant messages from Betty to Adam even when Betty manually types the text messages on her mobile phone 14.

For example, as shown in the message sequence of FIG. 15, Betty sends an instant message to Adam. The instant message is communicated 1535,1537 to the 1M service provider 240. The 1M service provider 240 receives, scans the instant message from Betty, and identifies words for which advertising is available; for each identified word, the 1M service provider 240 highlights the identified word. Preferably, the instant message-including the highlighted words-are then communicated 1539 to the mobile communication service provider 140 and, thereafter, both is communicated 1541 to the recipient (Adam), and communicated 1543 to the sender (Betty) for updating the 1M conversation of the sent message on Betty's mobile phone 14 with the highlighted words. Identifiers of both mobile phones 12,14 preferably are maintained in association with the highlighted keywords and respective additional content data.

Thereafter, a subsequent recorded utterance from Adam's phone 12 may be communicated 1545,1547 and received and transcribed to text by the 1M service provider 240, whereupon the transcription is compared to the highlighted words that are maintained in association with the identifier for Adam's phone 12. Upon a match, it is determined that one of the highlighted words has been selected for display of the advertising corresponding to such highlighted word. Consequently, the additional content data maintained in association with the highlighted word of the match is sent to Adam's phone 12 for display of the corresponding advertising. The additional content data is communicated 1549 to the mobile communication service provider 140 and then is communicated 1551 to Adam's phone 12.

In addition, a subsequent recorded utterance from Betty's phone 14 may be communicated 1553,1555 and received and transcribed to text by the 1M service provider 240, whereupon the transcription is compared to the highlighted words that are maintained in association with the identifier for Betty's phone 14. Upon a match, it is determined that one of the highlighted words has been selected for display of the corresponding advertising. Consequently, the additional content data maintained in association with the highlighted word of the match is sent to Betty's phone 14 for display of the corresponding advertising. The additional content data is communicated 1557 to the mobile communication service provider 140 and then is communicated 1559 to Betty's phone 14.

Figure 17:
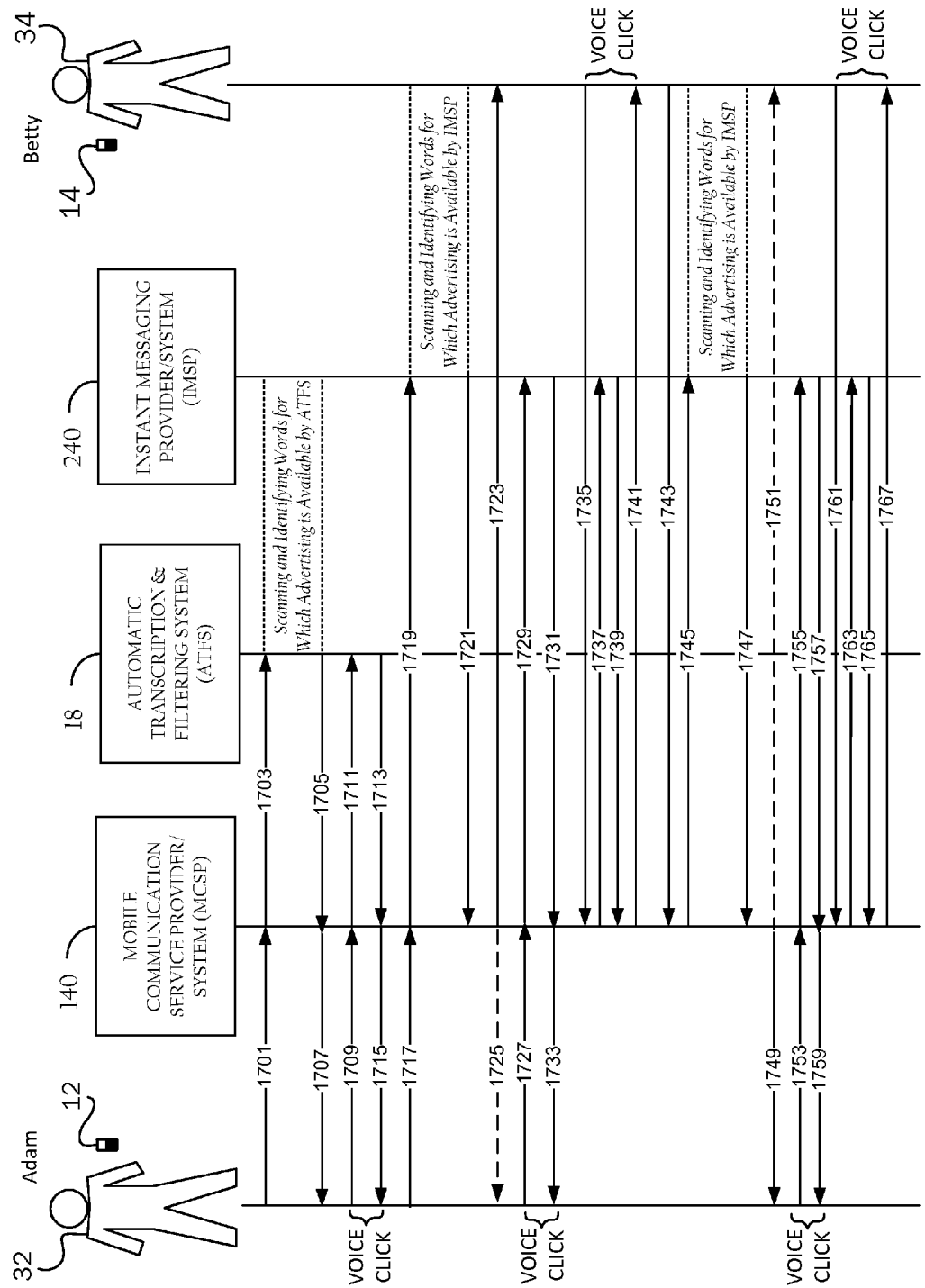
FIG. 17 is a graphical illustration showing the sequence of text messages in yet another preferred implementation of the invention, wherein the scanning and identifying of words for which advertising is available for delivery to a client device are performed by both the ATFS and the 1M service provider in the portion of the communication system of FIG. 3.

In the sixth embodiment, voice clicking is supported separately and independently by both the ATFS 18 and the IM service provider 240. FIG. 17 is a graphical illustration showing the sequence of text messages in such an additional preferred implementation of the invention, wherein scanning and identifying words for which advertising is available are performed by both the ATFS 18 and the IM service provider 240 in the portion of the communication system 10 of FIG. 3.

With reference to FIG. 17, Adam utters a message to be sent to Betty. The utterance is recorded in the form of audio data and is communicated 1701 to mobile communication service provider 140 and then communicated 1703 to the ATFS 18. In accordance with this implementation, the ATFS 18 receives and transcribes the recorded utterance from Adam and scans the transcription and identifies words for which advertising is available, and such identified words are highlighted. The transcribed and filtered text including the highlighted words are communicated 1705 to the mobile communication service provider 140 and then communicated 1707 to Adam's mobile phone 12. Additionally, the ATFS 18 maintains an association (preferably in a database) of the highlighted words, additional content data for the respective advertising for each identified word, and an identifier of the recipient (e.g., Adam's phone 12) to which the highlighted words were sent.

Thereafter, when a subsequent recorded utterance from Adam's phone 12 is communicated 1709, 1711 and received by the ATFS 18, it is transcribed to text and compared to the highlighted words that are maintained in association with the identifier for Adam's phone 12. Upon a match, it is determined that one of the highlighted words has been selected by Adam for display of the corresponding advertising on Adam's phone. Consequently, the additional content data maintained in association with the highlighted word of the match is sent to Adam's mobile phone 12 for display of the corresponding advertising on Adam's mobile phone 12.

The additional content data (C) itself may comprise the advertising for display or, preferably, the additional content data comprises an Internet web address. The additional content data is communicated 1713, 1715 to Adam's mobile phone 12, whereby, upon receipt, the mobile phone 12 is caused to present the advertising to Adam. In this regard, it will be appreciated that if the additional content data includes a web address (e.g., www.suzysushi.com). such address may be passed to the mobile web browser application of the mobile phone 12 for display of the advertising via the web browser.

As shown in the message sequence of FIG. 17, Adam then sends 1717, 1719 an instant message to Betty. The instant message from Adam to Betty includes the transcribed and filtered text received from the ATFS 18, but does not include the highlighted words from the ATFS 18. In accordance with this implementation, the IM service provider 240 receives and scans the instant message for appropriate words for which advertising is available. The words identified for which advertising is available are highlighted by the IM service provider 140. Preferably, the instant message-including the highlighted keywords-are then communicated 1721 to the mobile communication service provider 140 and, thereafter, both are communicated 1723 to the recipient of the instant message, and are communicated 1725 to the sender of the instant message for updating of the sent message on the sender's mobile phone with highlighting. Identifiers of both mobile phones 12,14 preferably are maintained in association with the highlighted keywords and respective additional content data. Alternatively, the IM service provider 240 communicates the highlighted keywords only to the recipient of the instant message, and only the mobile phone of the recipient is maintained in the association.

Thereafter, a subsequent recorded utterance from Adam's phone 12 may be communicated 1727, 1729 and received and transcribed to text by the IM service provider 240, whereupon the transcription is compared to the highlighted words that are maintained in association with the identifier for Adam's phone 12. Upon a match, it is determined that one of the highlighted words has been selected for display of the corresponding advertising. Consequently, the additional content data maintained in association with the highlighted word of the match is sent to Adam's phone 12 for display of the corresponding advertising. The additional content data is communicated 1731 to the mobile communication service provider 140 and then is communicated 1733 to Adam's phone 12.

In addition, a subsequent recorded utterance from Betty's phone 14 may be communicated 1735, 1737 to, and received and transcribed to text by, the IM service provider 240, whereupon the transcription is compared to the highlighted words that are maintained in association with the identifier for Betty's phone 14. Upon a match, it is determined that one of the highlighted words has been selected for display of the corresponding advertising. Consequently, the additional content data maintained in association with the highlighted word of the match is sent to Betty's phone 14 for display of the corresponding advertising. The additional content data is communicated 1739 to the mobile communication service provider 140 and then is communicated 1741 to Betty's phone 14.

In each case, the additional content data (C) may itself comprise the advertising for display or, preferably, the additional content data comprises an Internet web address. The additional content data is communicated to the respective mobile phone 12,14, whereby, upon receipt, the mobile phone 12,14 is caused to present the advertising content to the user. In this regard, it will be appreciated that if the additional content data includes a web address (e.g., www.suzysushi.com). such address may be passed to the mobile web browser application of the mobile phone 12 for display of the advertising via the web browser.

It will be appreciated that in this implementation, the IM service provider 240 may utilize the same technology as the ATFS 18 in receiving, transcribing, and comparing an utterance to highlighted words. Moreover, the ability of the IM service provider 240 to do this enables highlighting of words in instant messages from Betty to Adam even when Betty manually types the text messages on her mobile phone 14.

For example, as shown in the message sequence of FIG. 17, Betty sends an instant message to Adam. The instant message is communicated 1743,1745 to the IM service provider 240. The IM service provider 240 receives and scans the instant message from Betty and identifies words for which advertising is available; the identified words for which respective advertising is available are then highlighted. Preferably, the instant message-including the highlighted words-are then communicated 1747 to the mobile communication service provider 140 and, thereafter, both are communicated 1749 to the receiver, and are communicated 1751 to the sender for updating of the sent message with highlighting. Identifiers of both mobile phones 12,14 preferably are maintained in association with the highlighted keywords and respective additional content data. Alternatively, the IM service provider 240 communicates the highlighted keywords only to the receiver and only an identifier of the mobile phone of the receiver is maintained in the database.

Thereafter, a subsequent recorded utterance from Adam's phone 12 may be communicated 1753,1755 and received and transcribed to text by the 1M service provider 240, whereupon the transcription is compared to the highlighted words that are maintained in association with the identifier for Adam's phone 12. Upon a match, it is determined that one of the highlighted words has been selected for display of the corresponding advertising. Consequently, the additional content data maintained in association with the highlighted word of the match is sent to Adam's phone 12 for display of the corresponding advertising. The additional content data is communicated 1757 to the mobile communication service provider 140 and then is communicated 1759 to Adam's phone 12.

In addition, a subsequent recorded utterance from Betty's phone 14 may be communicated 1761,1763 and received and transcribed to text by the 1M service provider 240, whereupon the transcription is compared to the highlighted words that are maintained in association with the identifier for Betty's phone 14. Upon a match, it is determined that one of the highlighted words has been selected for display of the corresponding advertising. Consequently, the additional content data maintained in association with the highlighted word of the match is sent to Betty's phone 14 for display of the corresponding advertising. The additional content data is communicated 1765 to the mobile communication service provider 140 and then is communicated 1767 to Betty's phone 14.

It should be particularly noted that, as described above, in the fifth and sixth implementations, wherein the 1M service provider 240 supports voice clicking, both Adam and Betty preferably are able to select keywords that are highlighted in a message, regardless of whether Adam or Betty is the recipient of the message. In this respect, the 1M service provider 240 preferably communicates 1515,1517 and 1541,1543 and 1723,1725 and 1749,1751 the highlighted keywords to both sender and receiver for a particular message, and identifiers of both mobile phones 12,14 preferably are maintained in association with the highlighted keywords and respective additional content data. In FIGS. 15 and 17, examples of both Adam and Betty performing voice clicks are shown. Such capabilities also preferably is implemented when instant messages are displayed in a threaded conversation context, which threaded conversation appears substantially similar to an 1M conversation.

As will be apparent from consideration of these foregoing six implementations, as text messages (whether in the form of text messaging or instant messages) are propagated through a communication system 10, one or more of the elements of the system 10 may be equipped to conduct scanning and identify words thereof for which advertising is available for delivery in accordance with embodiments of the invention.

Furthermore, the teachings of the present invention are not confined to the English language, but are equally applicable in many other languages as well.

Optionally, in the event that there are multiple possible interpretations of an utterance in comparing the transcription thereof to words maintained in a database, additional content data may be returned for each possible/known interpretation (thereby resulting, for example, in multiple tabs opening in a web browser), or only the additional content data corresponding to the highest confidence in the match may be returned.

Still yet, it is contemplated that that highlighted words will be displayed, but it will not be possible to speak them in order to view the corresponding advertising. This may result from the user being in a noisy environment, or being in a quiet environment where it would be disruptive to speak. In this case, a manual method of selecting highlighted keywords is made available to augment voice clicking. Such alternative may include keyboard navigation, navigation via a touch panel, navigation via a pointing device, or other conventional navigation means.

It also will be appreciated that the association maintained in a database between the words, the respective additional content data, and the identifiers may be kept for a short period of time (minutes or hours), or a longer period of time (days, weeks, or months). Accordingly, a user may retrieve the advertising in certain situations if that user remembers the highlighted word.

Furthermore, voice commands or cues may be used to indicate that an utterance is intended to contain a previously highlighted word and that the advertising associated with such previous highlighted word is now desired. In this regard, the cue may be "Go" and used, for example, by sending recorded audio representing the utterance "Go Sushi".

Additionally, it is contemplated that selection of an appropriate button on the user's mobile device will indicate the desired recipient of an utterance, and utterances in certain scenarios may be appropriate for sending to more than one recipient (such as in the third implementation, wherein both the ATFS 18 and mobile communication service provider 140 transcribe utterances, or in the sixth implementation, wherein both the ATFS 18 and 1M service provider 240 transcribe utterances).

It will also be appreciated that in some embodiments of the invention, the transcription of one or more utterances can be performed by a mobile communication device rather than by, for example, a backend server. For instance, in some embodiments an utterance in performance of a voice click may be transcribed by the mobile communication device rather than by a server. In such scenarios, the transcribed utterance may be sent to the party maintaining the association of the highlighted word with the corresponding additional content data, or the mobile device may maintain such association and may conduct the comparison and obtain the corresponding advertising for display without communicating the transcription.

In addition to the foregoing, in an alternative embodiment of the invention, in which a transcript is played on the mobile communication device for verification before sending, instead of aural cueing, tactile cueing is used. For example, when a word is played back for which advertising is available, the mobile phone may vibrate in order to emphasize such word. Such tactile cueing may be used in place of, or in addition to, aural cueing.

Additionally, rather than presenting advertising upon utterance of an emphasized word in accordance with the foregoing embodiments and implementations of the invention, some other action may occur in addition to, or in substitution for, the presentation of such advertising, such as, for example, the opening of an application on the mobile communication device or the calling of a telephone number.

While the foregoing implementations and detailed description have included in some form or fashion the transcription of an utterance to text, it will be appreciated that certain aspects and features of the invention do not require necessarily require that there by any form of transcription. In particular, aspects of the invention broadly relate simply to methods, systems, and software that facilitate presentation of advertising that relates to a word that is part of text of a message.

Figure 18:
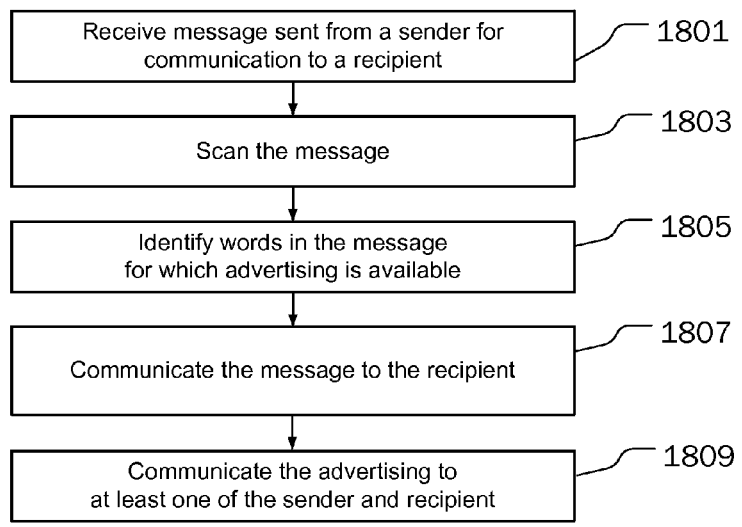
FIG. 18 is a flowchart of steps in a general method performed in accordance with preferred implementations of the invention.

With reference to FIG. 18, a preferred method 1800 of one such broad aspect includes the steps of receiving 1801 a message sent from a sender for communication to a recipient; scanning 1803 words of the text of the message; identifying 1805 scanned words for which advertising is available for delivery to a client device; communicating 1807 the message to the recipient; and communicating 1809 advertising for an identified word of the text of the message for presenting to at least one of the sender and recipient.

Figure 19:
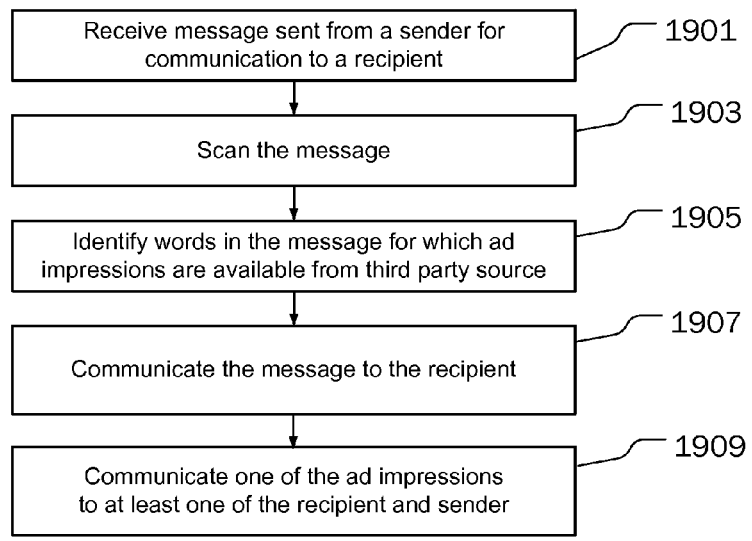
FIG. 19 is a flowchart of steps of another general method performed in accordance with preferred implementations of the invention.

With reference to FIG. 19, another broad preferred method 1900 includes the steps of receiving 1901 a message sent from a sender for communication to a recipient; scanning 1903 words of the text of the message; identifying 1905 scanned words for which ad impressions are available from a third party source, such as an ad network, for delivery to at least one of the sender or the recipient; communicating 1907 the message to the recipient; and communicating 1909 advertising for an identified word of the text of the message for presenting to the at least one of the sender and recipient. In this regard, the words for which ad impressions are available are identified by comparing the words with criteria of ad campaigns by one or more ad networks, as described previously herein.

Figure 20:
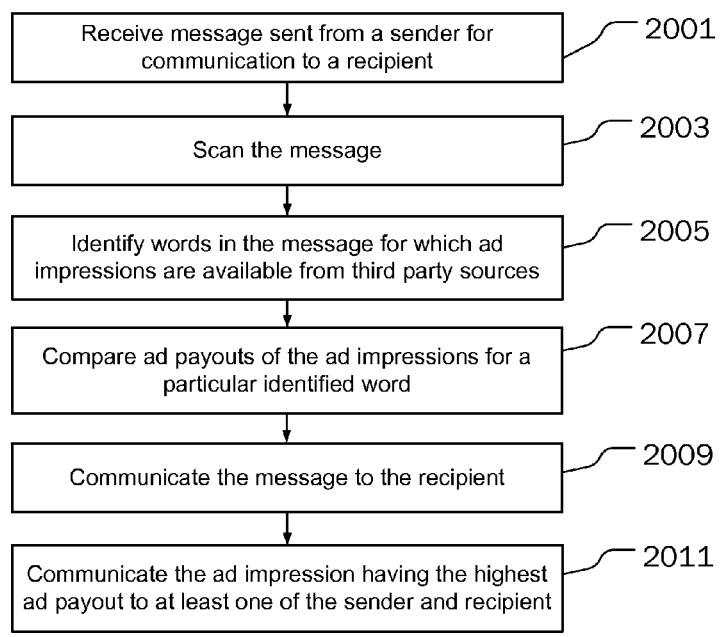
FIG. 20 is a flowchart of steps of a general method performed in accordance with preferred implementations of the invention.

With reference to FIG. 20, another broad preferred method 2000 includes the steps of receiving 2001 a message sent from a sender for communication to a recipient; scanning 2003 words of the text of the message; identifying 2005 scanned words for which ad impressions are available from third party sources, such as an ad networks, for delivery to at least one of the sender or the recipient; comparing 2007 ad payout levels of the ad impressions that are available for a particular identified word; communicating 2009 the message to the recipient; and communicating 2011 an ad impression having the highest ad payout level for the particular identified word of the text of the message for presenting to the at least one of the sender and recipient. The ad payout levels preferably are provided by each ad network and may be based on information provided to the ad networks, such information including, for example, the identified words; all or part of the text of the message; information regarding the at least one of the sender and recipient; temporal information regarding the at least one of the sender and recipient; and demographic, psychometric, or past history of the at least one of the sender or recipient of the message.

Figure 21:
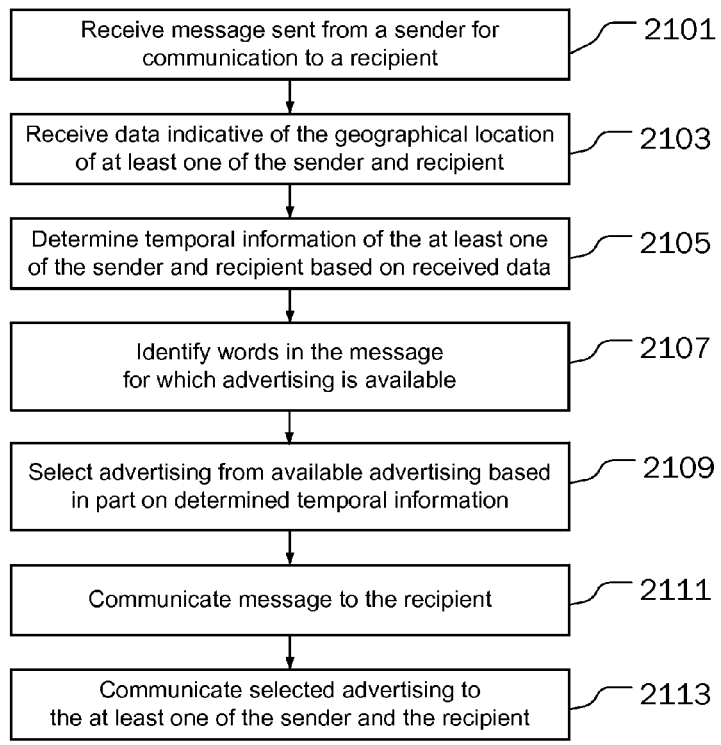
FIG. 21 is a flowchart of steps of another general method performed in accordance with preferred implementations of the invention.

Yet another broad preferred method 2100 is illustrated in FIG. 21 and relates to temporal information. In this regard, the method 2100 includes the steps of receiving 2101 a message sent from a sender for communication to a recipient; receiving 2103 data indicative of the geographical location of at least one of the sender and recipient; determining 2105 temporal information of the at least one of the sender and recipient based on the received data; identifying 2107 words of the text of the message for which advertising is available; selecting 2109 advertising from available advertising based in part on determined temporal information; communicating 2111 the message to the recipient; and communicating 2113 the selected advertising to the at least one of the sender and recipient of the message.

Exemplary sequences of communications are illustrated with reference to FIGS. 22 and 23. In this respect, each of FIGS. 22 and 23 is a graphical illustration showing a sequence of communications in a preferred implementation of the invention, wherein the identifying of words for which advertising is available for delivery to a client device is performed by the MCSP 140 and advertising is obtained from one of two ad networks 2291,2293.

Figure 22:
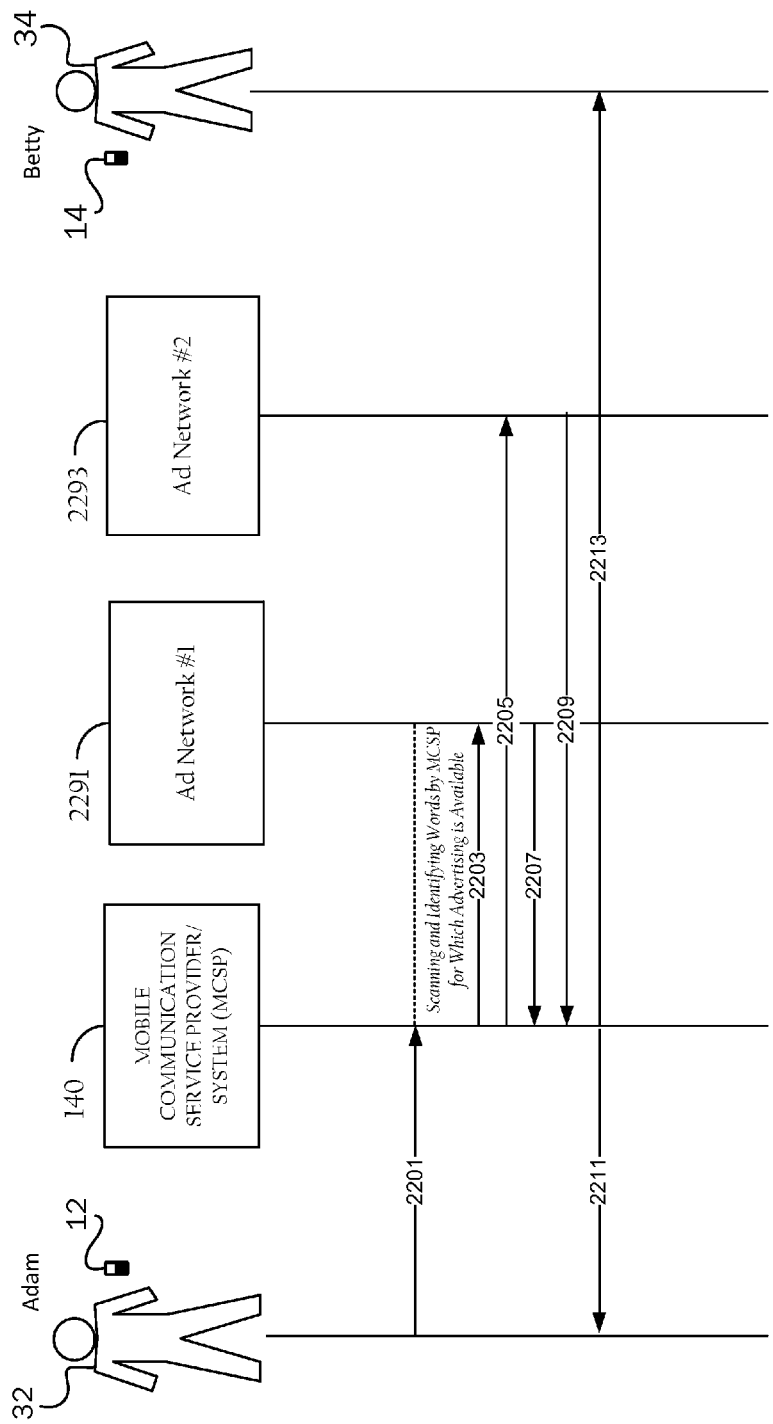
FIG. 22 is a graphical illustration showing a sequence of communications in a preferred implementation of the invention, wherein the identifying of words for which advertising is available for delivery to a client device is performed by a mobile communications service provider and advertising is obtained from ad networks.

In FIG. 22, an SMS text message is sent by Adam to Betty. In accordance therewith, the mobile device 12 communicates 2201 a text message via the SMS protocol to the MCSP 140. The MCSP 140 scans the words of the text message and identifies words for which advertising is available. This is done by comparing the words of the text message with criteria regarding ad campaigns being run by the two ad networks. Assuming words match the criteria of each of the ad networks 2291,2293, the MCSP 140 communicates 2203 the matching words, together with other information, to the ad network 2291, and the MCSP 140 communicates 2205 the matching words, together with other information, to the ad network 2293. Ad network 2291 responds back 2207 with one or more ad impressions and respective ad payouts therefor, and ad network 2293 responds back 2209 with one or more ad impressions and respective ad payouts therefor. The MCSP 140 determines the ad impressions having the highest payout level and, based at least in part on this determination, communicates 2211 one or more ad impressions to the sender and communicates 2213 one or more ad impressions to the recipient along with the text message.

Figure 23:
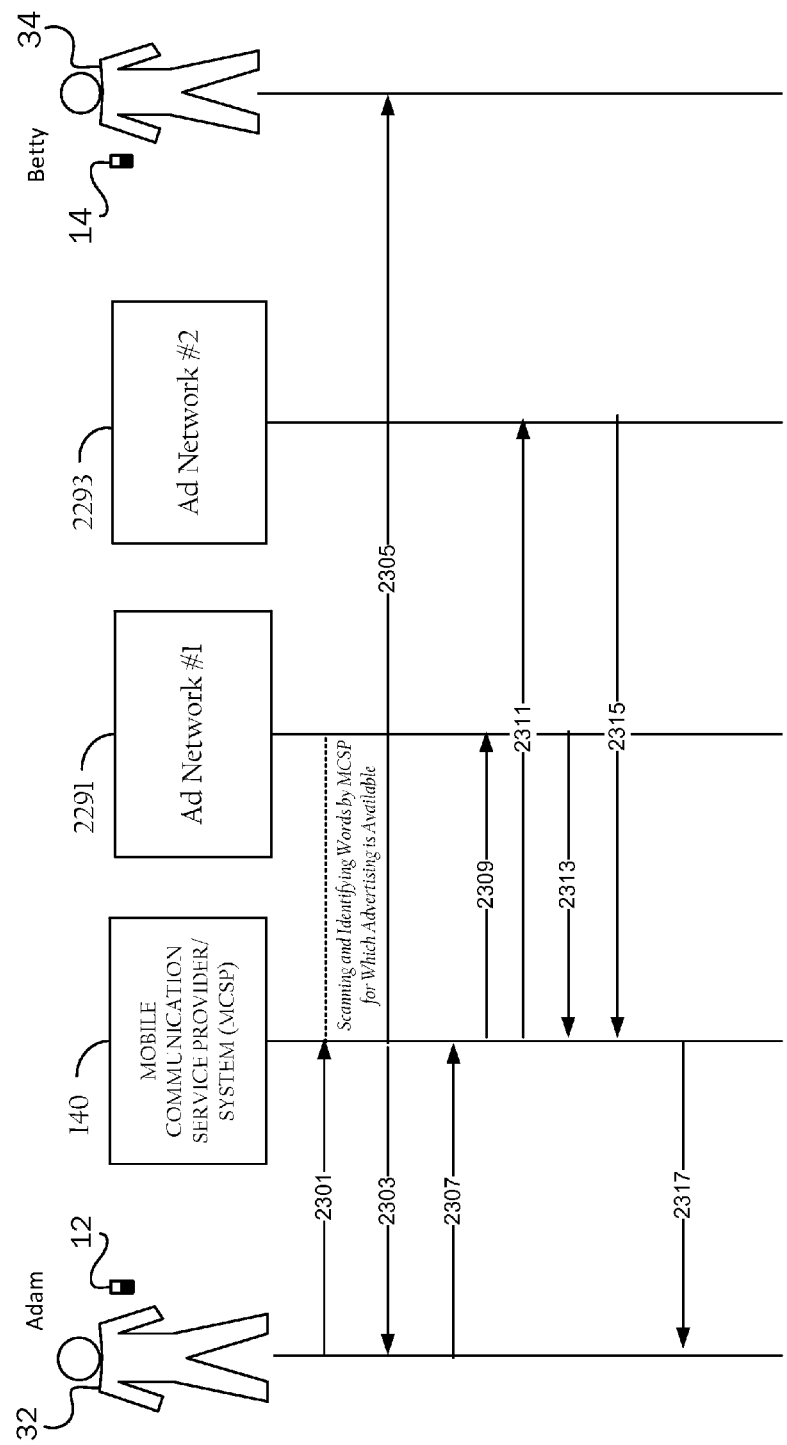
FIG. 23 is a graphical illustration showing an alternative sequence of communications in a preferred implementation of the invention, wherein the identifying of words for which advertising is available for delivery to a client device is performed by a mobile communications service provider and advertising is obtained from ad networks.

In FIG. 23, an SMS text message also is sent by Adam to Betty in similar manner to FIG. 22. In accordance therewith, the mobile device 12 communicates 2301 a text message via the SMS protocol to the MCSP 140. The MCSP 140 scans the words of the text message and identifies words for which advertising is available. This is done by comparing the words of the text message with criteria regarding ad campaigns being run by the two ad networks. Assuming words match the criteria of each of the ad networks 2291,2293, the MCSP 140 communicates an indication of the availability of ad impressions for the identified words by emphasizing the identified words in the text message. The emphasized words are communicated 2303 to the sender by the MCSP 140 and the emphasized words are communicated 2305 by the MCSP 140 to the sender along with the text message.

Either Adam or Betty may (or may not) choose to view the ad impression for a particular emphasized word by selecting the emphasized word and communicating such selection back to the MCPS 140. Thus, as illustrated in FIG. 23, a selection is communicated 2307 from Adam's mobile device 12 to the MCPS 140. Upon receiving a selection from either the sender or the receiver, the MCPS 140 communicates 2309 the matching words, together with other information, to the ad network 2291, and the MCSP 140 communicates 2311 the matching words, together with other information, to the ad network 2293. Ad network 2291 responds back 2313 with one or more ad impressions and respective ad payouts therefor, and ad network 2293 responds back 2315 with one or more ad impressions and respective ad payouts therefor. The MCSP 140 determines the ad impressions having the highest payout level and, based at least in part on this determination, communicates 2317 one or more ad impressions to Adam, who requested the ad impression. It is believed that the ad impression payout may be higher in this scenario as the ad impression is provided on demand, i.e., it has actually been requested for viewing, whereas in FIG. 22 the ad impression is provided without request.

Figure 24:
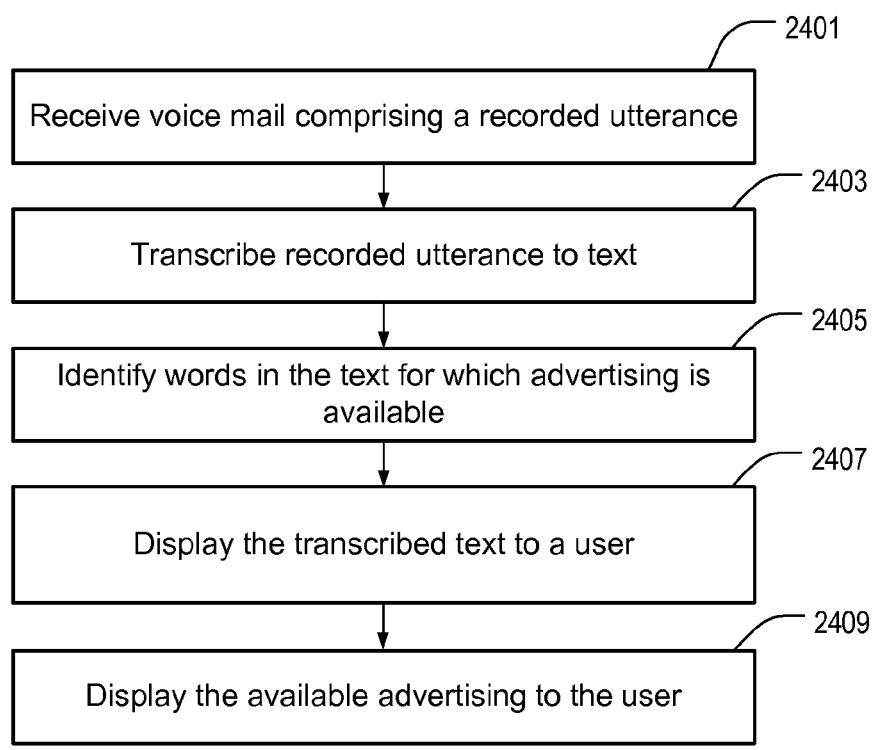
FIG. 24 is a flowchart of steps of another general method performed in accordance with preferred implementations of the invention.

With reference to FIG. 24, a preferred method 2400 of one such broad aspect includes the steps of receiving 2401 a voicemail comprising a recorded utterance; transcribing 2403 the recorded utterance to text; identifying 2405 words in the text for which advertising is available; displaying 2407 the text to the recipient; and displaying 2409 advertising for an identified word of the text of the message. Preferably this displaying is accomplished via a webpage, although it is contemplated that this displaying may be accomplished via a text message or an instant message. Alternatively, or conjunctively, the recorded utterance may be presented as audio. Alternatively, as in the above cases, rather than directly displaying the advertising immediately, the words in the text for which advertising is available may be highlighted, and the user may then select a highlighted word (via a voice click or a more traditional UI) to access the advertising associated with that highlighted word.

It now will be appreciated that, among other things, systems, methods, and software have been disclosed relating to the delivery and presentation of ad impressions on mobile communication devices:
- wherein communications utilized include text messaging, instant messaging, or both;
- wherein an automatic speech recognition (ASR) engine is utilized;
- wherein ad impressions are selected based, at least in part, on keywords, phrases, or fragments that are identified in the transcribed text generated from such ASR engine;
- wherein communications utilized include text messaging, instant messaging, or both; and
- wherein ad impressions are selected based, at least in part on awareness and/or geographical location of the location of a mobile communication device, and/or proximity of a mobile communication device to a location.

Moreover, it will be appreciated that:
- ad impressions may be delivered within a text message or within an instant message in a manner that is generally unobtrusive;
- revenues may be generated from delivering the ad impressions, whereby a provider of instant messaging or text messaging may derive monetary benefit from providing such service, and whereby users of such service may be provided with contextually relevant advertising in an unobtrusive manner;
- ad impressions may be incorporated into a user interface of a mobile device;
- ad impressions may indicate time-of-day, week, month, weather, seasonality, geographical proximity, and/or location of a mobile device; and
- the delivery and/or presentation of an ad impression may be based, at least in part, on awareness of time-of-day, week, month, weather, seasonality, geographical proximity, and/or location of the mobile device.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method comprising:
as implemented by one or more computing devices configured with specific computer-executable instructions,
receiving a message from a sender communication device, wherein the message is configured to be sent to a recipient communication device using an identifier of the recipient communication device;
identifying a word, for which advertising is available, from the message;
receiving geographical location information from the recipient communication device;
determining temporal information pertaining to the recipient communication device based at least on the geographical location information received from the recipient communication device;
sending the word identified from the message and the temporal information to a third party;
obtaining a plurality of advertisements from the third party based at least in part on the word identified in the message and the temporal information,
wherein each advertisement of the plurality of advertisements is associated with a respective payment level, and
wherein each respective payment level is based at least in part on the temporal information pertaining to the recipient communication device;
associating in a data store of the one or more computing devices the word identified in the message with the plurality of advertisements and the identifier of the recipient communication device, wherein the one or more computing devices are remote from the sender communication device and the recipient communication device;
sending the message to the recipient communication device;
receiving, from the recipient communication device, the identifier of the recipient communication device;
receiving, from the recipient communication device, a transcribed utterance that includes the word identified in the message;
selecting at least one advertisement of the plurality of advertisements, wherein the selecting is based at least in part on the respective payment level of the at least one advertisement; and
based at least in part on the word identified in the message being present in the transcribed utterance and being associated with the plurality of advertisements and the identifier of the recipient communication device, sending the at least one advertisement to the recipient communication device using the identifier of the recipient communication device.

2. The computer-implemented method of claim 1, wherein the sender communication device comprises a mobile phone.

3. The computer-implemented method of claim 2, wherein the recipient communication device comprises a mobile phone.

4. The computer-implemented method of claim 1, wherein a content of the at least one advertisement is based at least in part on information about a user of the recipient communication device.

5. The computer-implemented method of claim 4, wherein the third party comprises an advertising network, wherein the plurality of advertisements from the third party are obtained from the advertising network, and wherein information about the user of the recipient communication device further comprises at least one of: demographic, psychometric, or historical profile information about the user of the recipient communication device.

6. The computer-implemented method of claim 1, wherein the at least one advertisement is associated with one or more keywords, and at least one of the one or more keywords matches at least one word included in the message.

7. The computer-implemented method of claim 1, wherein selecting at least one advertisement of the plurality of advertisements based at least in part on the respective payment level of the at least one advertisement comprises selecting the advertisement with the highest respective payment level among the plurality of advertisements.

8. The computer-implemented method of claim 1, wherein selecting at least one advertisement of the plurality of advertisements is based at least in part on the respective payment level of the at least one advertisement and a location of the recipient communication device.

9. The computer-implemented method of claim 1, wherein the message comprises an SMS message.

10. The computer-implemented method of claim 1, wherein the message comprises an audio message and the computer-implemented method further comprises transcribing the audio message to text.

11. The computer-implemented method of claim 1, wherein determining temporal information based at least on the geographical location information received from the recipient communication device comprises determining the current time of day at a geographical location of the recipient communication device indicated by the geographical location information received from the recipient communication device.

12. A system comprising one or more hardware processors configured to:
　receive a message from a sender communication device, wherein the message is configured to be sent to a recipient communication device using an identifier of the recipient communication device;
　identify a word, for which advertising is available, from the message;
　receive geographical location information from the recipient communication device;
　determine temporal information pertaining to the recipient communication device based at least on the geographical location information received from the recipient communication device;
　send the word identified from the message and the temporal information to a third party;
　obtain a plurality of advertisements from the third party based at least in part on the word identified in the message and the temporal information,
　　wherein each advertisement of the plurality of advertisements is associated with a respective payment level, and
　　wherein each respective payment level is based at least in part on the temporal information pertaining to the recipient communication device;
　associate in a data store of the one or more computing devices the word identified in the message with the plurality of advertisements and the identifier of the recipient communication device, wherein the one or more computing devices are remote from the sender communication device and the recipient communication device;
　send the message to the recipient communication device;
　receive, from the recipient communication device, the identifier of the recipient communication device;
　receive, from the recipient communication device, a transcribed utterance that includes the word identified in the message;
　select at least one advertisement of the plurality of advertisements, wherein the selection is based at least in part on the respective payment level of the at least one advertisement; and
　based at least in part on the word identified in the message being present in the transcribed utterance and being associated with the plurality of advertisements and the identifier of the recipient communication device, send the at least one advertisement to the recipient communication device using the identifier of the recipient communication device.

13. The system of claim 12, wherein a content of each advertisement of the plurality of advertisements is based at least in part on information about a user of the recipient communication device.

14. The system of claim 12, wherein the at least one advertisement of the plurality of advertisements is associated with one or more keywords, and at least one of the one or more keywords matches at least one word included the message.

15. The system of claim 12, wherein the selection comprises selecting the advertisement with the highest respective payment level.

16. The system of claim 12, wherein the selection is further based at least in part on a location of the recipient communication device.

17. The system of claim 12, wherein the third party comprises an advertising network and wherein the plurality of advertisements is received from the advertising network.

18. The system of claim 12, wherein the message comprises a dictated email message and the one or more processors are further configured to transcribe the dictated email message to text.

19. The system of claim 12, wherein the message comprises a dictated text message and the one or more processors are further configured to transcribe the dictated text message to text.

20. A non-transitory computer-readable storage medium storing computer-executable instructions, that, when executed by one or more computing systems, configure the one or more computing systems to perform operations comprising:
　receiving a message from a sender communication device, wherein the message is configured to be sent to a recipient communication device using an identifier of the recipient communication device;
　identifying a word, for which advertising is available, from the message;
　receiving geographical location information from the recipient communication device;
　determining temporal information pertaining to the recipient communication device based at least on the geographical location information received from the recipient communication device;
　sending the word identified from the message and the temporal information to a third party;
　obtaining a plurality of advertisements from the third party based at least in part on the word identified in the message and the temporal information,
　　wherein each advertisement of the plurality of advertisements is associated with a respective payment level, and
　　wherein each respective payment level is based at least in part on the temporal information pertaining to the recipient communication device;
　associating in a data store of the one or more computing devices the word identified in the message with the plurality of advertisements and the identifier of the recipient communication device, wherein the one or more computing devices are remote from the sender communication device and the recipient communication device;

sending the message to the recipient communication device;

receiving, from the recipient communication device, the identifier of the recipient communication device receiving, from the recipient communication device, a transcribed utterance that includes the word identified in the message;

selecting at least one advertisement of the plurality of advertisements, wherein the selecting is based at least in part on the respective payment level of the at least one advertisement; and based at least in part on the word identified in the message being present in the transcribed utterance and being associated with the plurality of advertisements and the identifier of the recipient communication device, sending the at least one advertisement to the recipient communication device using the identifier of the recipient communication device.

21. The non-transitory computer-readable storage medium of claim 20, wherein the respective payment level for each advertisement of the plurality of advertisements is further based at least in part on information about a user of the sender communication device.

22. The non-transitory computer-readable storage medium of claim 20, wherein a content of each advertisement of the plurality of advertisements is based at least in part on information about a user of the sender communication device.

23. The non-transitory computer-readable storage medium of claim 20, wherein the at least one advertisement of the plurality of advertisements is associated with one or more keywords, and at least one of the one or more keywords matches at least one word included in the message.

24. The non-transitory computer-readable storage medium of claim 20, wherein selecting at least one advertisement of the plurality of advertisements based at least in part on the respective payment level of the at least one advertisement comprises selecting the advertisement with the highest respective payment level.

25. The non-transitory computer-readable storage medium of claim 20, wherein the selecting is further based at least in part on the respective payment level of the at least one advertisement and a location of the sender communication device.

26. The non-transitory computer-readable storage medium of claim 20, wherein the third party comprises an advertising network and wherein the plurality of advertisements is obtained from the advertising network.

27. The non-transitory computer-readable storage medium of claim 20, wherein the message comprises an instant message.

28. The non-transitory computer-readable storage medium of claim 20, wherein the message comprises a voicemail and the method further comprises transcribing the voicemail to text.

* * * * *